United States Patent
Hiraki et al.

(10) Patent No.: US 6,962,050 B2
(45) Date of Patent: Nov. 8, 2005

(54) HYBRID MACHINE WITH HYDRAULIC DRIVE DEVICE

(75) Inventors: Hikosaburo Hiraki, Oyama (JP); Koichiro Itow, Tokyo (JP); Hiroaki Inoueo, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 205 days.

(21) Appl. No.: 10/275,070

(22) PCT Filed: May 18, 2001

(86) PCT No.: PCT/JP01/04146
§ 371 (c)(1),
(2), (4) Date: Nov. 1, 2002

(87) PCT Pub. No.: WO01/88381
PCT Pub. Date: Nov. 22, 2001

(65) Prior Publication Data
US 2003/0097837 A1 May 29, 2003

(30) Foreign Application Priority Data
May 19, 2000 (JP) .................. 2000-148503

(51) Int. Cl.⁷ .............. F15B 11/00; E02F 9/20
(52) U.S. Cl. .............. 60/414; 60/484; 60/486
(58) Field of Search .............. 60/414, 476, 484, 60/486

(56) References Cited

U.S. PATENT DOCUMENTS

| | | | | | |
|---|---|---|---|---|---|
| 3,971,215 A | * | 7/1976 | Baron et al. | .......... | 60/414 |
| 4,928,487 A | * | 5/1990 | Nikolaus | .......... | 60/414 |
| 4,961,316 A | * | 10/1990 | Corke et al. | .......... | 60/476 |
| 5,179,836 A | * | 1/1993 | Dantlgraber | .......... | 60/414 |
| 6,065,565 A | * | 5/2000 | Puszkiewicz et al. | .......... | 182/2.9 |
| 6,199,307 B1 | * | 3/2001 | Kagoshima et al. | .......... | 37/443 |
| 6,379,119 B1 | * | 4/2002 | Truninger | .......... | 417/22 |
| 6,460,332 B1 | * | 10/2002 | Maruta et al. | .......... | 60/414 |
| 6,666,022 B1 | * | 12/2003 | Yoshimatsu et al. | .......... | 60/414 |
| 6,678,972 B2 | * | 1/2004 | Naruse et al. | .......... | 37/466 |
| 6,708,787 B2 | * | 3/2004 | Naruse et al. | .......... | 180/53.8 |

FOREIGN PATENT DOCUMENTS

| | | | |
|---|---|---|---|
| DE | 39-18119 A1 | 12/1990 | |
| JP | 59-37307 | 2/1984 | |
| JP | 59-123086 | 8/1984 | |
| JP | 60-139902 | 7/1985 | |
| JP | 62-80302 | 4/1987 | |
| JP | 3-52403 | 5/1991 | |
| JP | 6-305699 | 11/1994 | |
| JP | 06305699 A | * 11/1994 | ............ B66F/9/22 |
| JP | 10-331803 | 12/1998 | |

OTHER PUBLICATIONS

EPO Search Report mailed Nov. 3, 2004.

* cited by examiner

Primary Examiner—Thomas E. Lazo
(74) Attorney, Agent, or Firm—Rader, Fishman & Grauer PLLC

(57) ABSTRACT

A hybrid machine with a hydraulic drive device having hydraulic actuators allowed to operate against and by external loads is provided. To this end, the hybrid machine comprises hydraulic cylinders (7), first hydraulic pumps (P1) connected, with closed circuits, to head side pressure receiving chambers (7S) and bottom side pressure receiving chambers (7L) of the hydraulic cylinders (7), and second hydraulic pumps (P2) connected, with open circuits, to the bottom side pressure receiving chambers (7L) and an external oil chamber (10), wherein the first and second hydraulic pumps (P1, P2) are connected to electric motors (M) so as to be driven.

29 Claims, 28 Drawing Sheets

HYBRID MACHINE WITH HYDRAULIC DRIVE DEVICE

TECHNICAL FIELD

The present invention relates to a hybrid machine with a hydraulic drive device.

BACKGROUND ART

A hybrid machine, roughly speaking, includes an engine, a generator with the engine as a drive source, an electric motor, and a secondary battery for storing electromotive force of the electric motor generated by reverse driving of the electric motor by an external load, in which the electric motor receives electric power from the generator and the secondary battery so as to be driven. Hybridization aims at saving of energy and a reduction in pollution, and in recent years, it has been put to practical use in an ordinary vehicle and achieves favorable results. The saving of energy results from regeneration of electromotive force based on the reverse driving of the electric motor generated when a vehicle is braked and goes downhill as driving electric power for the electric motor, and a reduction in the fuel consumption of the engine owing to this regeneration. Meanwhile, the reduction in pollution results from the reduction in the fuel consumption of the engine, that is, a reduction in exhaust gas.

Incidentally, energy recovery of storing the electromotive force based on the reverse driving of the electric motor in the second battery in the ordinary vehicle can be expected in city traveling accompanied by frequent braking, but it is difficult to expect the energy recovery in expressway traveling accompanied by infrequent braking. Namely, according to this hybrid ordinary vehicle, the energy recovery cannot be performed constantly.

However, in construction equipment such as a hydraulic shovel or a wheel loader, a mine machinery, mechanical handling equipment such as a folklift, or the like provided with a hydraulic drive device which constantly performs repetitive operation, the hydraulic drive device has hydraulic cylinders which can be repeatedly extended/contracted not only against external loads but also by the external loads. Further, the machine such as a hydraulic shovel having a rotation mechanism has rotation motors which repeat normal/reverse rotations and receive rotation inertial force as an external load when being braked. Namely, according to these machines, energy recovery can be performed constantly from the hydraulic cylinders and/or the rotation motors.

Accordingly, if such a machine with the hydraulic drive device is hybridized, it can achieve the saving of energy and reduction in pollution more constantly at least than the hybrid ordinary vehicle, whereby the hybridization of such a machine with the hydraulic drive device is desired.

DISCLOSURE OF THE INVENTION

An object of the present invention is to suitably hybridize a machine with a hydraulic drive device having hydraulic actuators allowed to operate against and by external loads. Moreover, another object of the present invention is to provide a hydraulic drive device best suited to hybridization.

A first constitution of a hybrid machine with a hydraulic drive device according to the present invention is characterized in that a hybrid machine including a power source, a generator driven by power of the power source, electric motors, and a secondary battery for storing electromotive force of the electric motors generated by reverse driving of the electric motors by external loads, the electric motors receiving electric power from the generator and the secondary battery so as to be driven, includes hydraulic cylinders allowed to be extended and contracted against and by external loads, first hydraulic pumps connected, with closed circuits, to head side pressure receiving chambers and bottom side pressure receiving chambers of the hydraulic cylinders, and second hydraulic pumps connected, with open circuits, to the bottom side pressure receiving chambers and an external oil chamber, in which the first and second hydraulic pumps are connected to the electric motors so as to be driven.

According to such a first constitution, when the first hydraulic pumps suck oil in the head side pressure receiving chambers and discharge it to the bottom side pressure receiving chambers, the second hydraulic pumps suck oil in the oil chamber and discharge it to the bottom side pressure receiving chambers. Accordingly, the hydraulic cylinders are extended. Conversely, when the first hydraulic pumps suck oil in the bottom side pressure receiving chambers and discharge it to the head side pressure receiving chambers, the second hydraulic pumps suck the oil in the bottom side pressure receiving chambers and discharge it to the oil chamber. Accordingly, the hydraulic cylinders are contracted.

When the first and second hydraulic pumps are reversely driven by external loads, the electric motors are rotated to produce electricity (generate electricity). This electromotive force is stored in the secondary battery and recovered as energy, and together with electric power from the generator or by being switched, it becomes drive electric power of the electric motors. In other words, energy regeneration occurs.

Incidentally, the first and second hydraulic pumps have the function of a direction switching valve in open circuits. The direction switching valve controls the flow rate with a throttling operation in addition to the switching of the flow direction of oil, and hence it involves throttling loss (heat loss). However, the flow rate control by the first and second hydraulic pumps in the first constitution is performed by only driving of the first and second pumps, whereby no throttling loss occurs, thus producing an energy saving effect. Needless to say, since there is no direction switching valve, an economic effect is produced correspondingly.

Moreover, the oil quantity of each of the hydraulic cylinders at the time of extension/contraction depends on the discharge/suction of oil by the first and second pumps. Accordingly, even when subjected to external loads, the hydraulic cylinders are difficult to extend/contract by themselves if the first and second pumps are stopped. Incidentally, in the case of the hydraulic cylinder always subjected to an external load, in a prior art, the extension/contraction (runaway) of the hydraulic cylinder by the external load is prevented by providing a counterbalance valve, but in the first constitution, as described above, the oil quantity of each of the hydraulic cylinders at the time of extension/contraction depends on the discharge/suction of oil by both the pumps, whereby the extension/contraction of the hydraulic cylinders is put under the control of the operator without the hydraulic cylinders extending/contracting by themselves. Accordingly, the counterbalance valve is not provided in the first constitution. As examples of a power source, an engine, a fuel cell, and so on can be named.

As a second constitution, it is desirable that in the aforementioned first constitution, the first and second hydraulic pumps have a relation of approximately "A1:A2=Q1:(Q1+Q2)", where A1 is a piston pressure receiving area of the head side pressure receiving chamber, A2 is a piston pressure receiving area of the bottom side pressure receiving chamber, Q1 is a discharge amount per unit time of the first hydraulic pump, and Q2 is a discharge amount per unit time of the second hydraulic pump.

According to such a second constitution, since the relation of approximately "A1:A2=Q1:(Q1+Q2)" is established, the extension/contraction of the hydraulic cylinders can be performed with a just enough quantity of oil.

In a third constitution, the oil chamber in the aforementioned first constitution is limited to an accumulator.

According to such a third constitution, when the first hydraulic pumps suck oil in the head side pressure receiving chambers and discharge it to the bottom side pressure receiving chambers, the second hydraulic pumps suck oil in the accumulator and discharge it to the bottom side pressure receiving chambers. Accordingly, the hydraulic cylinders are extended. Conversely, when the first hydraulic pumps suck oil in the bottom side pressure receiving chambers and discharge it to the head side pressure receiving chambers, the second hydraulic pumps suck the oil in the bottom side pressure receiving chambers and discharge it to the accumulator. Accordingly, the hydraulic cylinders are contracted. Moreover, the accumulator directly pressurizes the accumulator sides of the second hydraulic pumps and indirectly pressurizes the second hydraulic pumps sides of the first hydraulic pumps. Hence, the occurrence of basic disadvantages in the hydraulic circuits such as aeration, cavitation, pitting, and the like in the first and second hydraulic pumps is reduced.

As a fourth constitution, it is desirable that in the aforementioned third constitution, the first and second hydraulic pumps be inclined shaft type piston pumps, the electric motor be of a double end output shaft type, and that the first pump be connected to one of a double end output shaft, and the second first pump be connected to the other thereof.

According to such a fourth constitution, although there are various types of hydraulic pumps such as a gear type, a vane type, a piston type, and the like, a piston type is desirable from the viewpoint of an increase in discharge pressure. Moreover, in the case of the piston type, an inclined shaft type is more desirable than a swash plate type from the viewpoint of high speed rotation resistance and robustness. Namely, since the inclined shaft type excellent in high speed rotation resistance and robustness is used in the fourth constitution, a small pump can be direct-coupled to the electric motor without a speed reducer therebetween even if the flow demand is large. Incidentally, from a first reason that the first and second hydraulic pumps are used in the third constitution and a second reason that different from pumps of the swash plate type and other types, in the inclined shaft type pump, both the pumps cannot be connected in series to the electric motor, both the pumps are each connected to the double end output shaft of the electric motor in the second constitution. Namely, an electric motor/pump assembly body which has attained compactification by eliminating a speed reducer can be provided. Of course, it can be arranged suitably in a machine without an allowance which is incapable of series connection.

As a fifth constitution, it is desirable that in the aforementioned third constitution, the accumulator be of a maximum operating pressure variable type.

According to such a fifth constitution, the maximum operating pressure means the upper limit pressure at the completion of the accumulation of pressure by the accumulator. By making this variable, control flexibility in the hybrid machine with the hydraulic drive device itself of the present invention increases. In other words, the saving of energy and other advantages can be increased (Incidentally, the detailed example of operation and effects will be described in the undermentioned embodiments).

As a sixth constitution, it is suitable that in the third constitution, with respect to a first passage which connects the first hydraulic pump and the head side pressure receiving chamber, a drive torque of the electric motor equal to a product value of a first relief pressure determined in advance for the first passage, and a sum of respective displacements per one rotation of the first and second hydraulic pumps be a maximum drive torque of the electric motor, and with respect to a second passage which connects the first and second hydraulic pumps and the bottom side pressure receiving chamber, a drive torque of the electric motor equal to a product value of a second relief pressure determined in advance for the second passage, and the sum of respective displacements per one rotation of the first and second hydraulic pumps be a maximum drive torque of the electric motor.

According to such a sixth constitution, the pump torque is "displacement per one rotation×discharge pressure" and equal to the drive torque of the electric motor. "Displacement per one rotation of a pump" is already known in the case of a fixed displacement pump, and in the case of a variable displacement pump, it is also known since the displacement is controlled. Meanwhile, "the relief pressure" is determined in advance as "the first and second relief pressures" in the sixth constitution, and hence it is also known. Therefore, the drive torque of the electric motor of "the sum of displacements per one rotation of both the pumps×relief pressure" is a controllable value. If the electric motor is rotated at a torque exceeding this drive torque, oil pressures equal to or higher than the first and second relief pressures are caused in the first and second passages respectively. Thus, in the sixth constitution, the drive torque of the electric motor of "the sum of displacements per one rotation of both the pumps×relief pressure" is made the maximum drive torque of the electric motor. In other words, during the rotation of the electric motor, oil pressures equal to or higher than the first and second relief pressures are not generated in the first and second passages. More concretely, according to the sixth constitution, by monitoring the drive torque of the electric motor, the relief function during the rotation of the electric motor can be fulfilled without providing a relief valve which is usually provided in a hydraulic circuit. Further, the maximum value of the drive torque of the electric motor is set freely, that is, changeable. Hence, if a controller such as a micon is used, variable relief control can be performed easily, freely, and economically by only the setting of a simple control program and a change in maximum drive torque.

Incidentally, if "relief control" and "variable relief control" are performed based the sixth constitution, relief does not occur as stated above since these controls are controls for preventing the occurrence of relief (however, this relief function occurs only during the rotation of the electric motor).

Incidentally, although the first relief pressure for the first passage and the second relief pressure for the second passage are provided in the sixth constitution, commonly the first and second relief pressures have the same value. Therefore, in the sixth constitution, these pressures may have the same value. Alternatively, they may be different from each other. In other words, with a first maximum drive torque of the electric motor of "the sum of displacements per one rotation of both the pumps×the first relief pressure" for the first passage and a second maximum drive torque of the electric motor of "the sum of displacements per one rotation of both the pumps×the second relief pressure" for the second passage, individual control is performed. Such individual control is suitable for the effective conformation and usage of the machine.

As a seventh constitution, it is desirable that in the aforementioned third constitution, when both or either one of the first and second hydraulic pumps is a piston pump, oil sumps which catch external leakage of oil from the piston pump, a third hydraulic pump which sucks the oil in the oil sumps, and a first switching valve which selectably leads discharged oil from the third hydraulic pump to either one of the accumulator or the oil sumps be provided.

According to such a seventh constitution, since external leakage of oil occurs in the piston pump, it is necessary to replenish the two passages or the accumulator with an oil quantity equivalent to the leakage. The leakage oil may be drained to either lower pressure side out of the first and second passages, but according to the third constitution, the lower pressure side also has high pressure depending on the machine, and this pressure becomes back pressure of a piston of the piston pump, which lowers torque efficiency of the pump. Moreover, the third constitution is a compromise constitution of a first hydraulic pump system closed circuit and a second hydraulic pump system open circuit, but the second hydraulic pump system is also a closed circuit when the second hydraulic pump system is seen including the accumulator. Incidentally, the capacity of the accumulator is basically required to be larger than a difference in volume between the head side pressure receiving chamber and the bottom side pressure receiving chamber, but in actuality, considering that heat generated in the pump, the actuator, and so on during driving is cooled, the accumulator needs to be considerably large. Thus, in the seventh constitution, the oil sumps and the third hydraulic pump are provided, so that the equivalent of leakage oil can be retuned to the first and second passages or the accumulator. It should be noted that in the seventh constitution, the first switching valve is provided such that the pressure in the accumulator does not escape to the oil sumps unconditionally by the addition of the oil sumps and conversely oil is not supplied into the accumulator without limitation by the addition of the third hydraulic pump. The accumulator in the seventh constitution corresponds to the oil sump in the first and second constitutions, and hence when seen from the oil sump in the first and second constitutions, the oil sump in the seventh constitution corresponds to a second oil sump.

As an eighth constitution, it is suitable that in the aforementioned seventh constitution, a variable relief valve be provided in the first and second passages, and that a second switching valve for selectively draining drain oil to either one of the accumulator or the oil sumps be provided on the drain side of the variable relief valve.

According to such an eighth constitution, this variable relief valve is different from "the variable relief control by making the maximum drive torque of the electric motor variable, in which relief does not occur" described in the aforementioned sixth constitution, and is a variable relief valve strictly as "an object" in which the relief actually occurs. The variable relief valve itself as "the object" is publicly known, but in the eighth constitution, the second switching valve is provided on the drain side of the variable relief valve. The second switching valve switchably drains drain oil to the accumulator or the oil sumps. Accordingly, it has, for example, the following utility (usage).

If the set relief pressure of the variable relief valve is lowered, and the second switching valve is switched to relieve oil to the accumulator, the temperature of the operating oil automatically increases by relief loss (which is heat generation) without putting a high load on the hydraulic cylinders and the first and second hydraulic pumps. Hence, by selecting the set relief pressure, a rise in the temperature of high-viscosity oil at the start of operation of a machine when it is cold and in a severe cold district (a so-called warming-up operation) can be performed efficiently.

Moreover, in the hydraulic circuit, bubbles once produced by cavitation and aeration do not naturally disappear easily, but in the sixth constitution, if the set relief pressure of the variable relief valve is lowered and the second switching valve is switched to relieve the oil to the oil sumps, the pressure of the circuit does not increase, whereby if the first and second hydraulic pump are external gear pumps, a difference between an increase and a decrease in trapped pressure in a mesh portion of gears can be reduced, and hence pitting and the like in a gear surface can be prevented. Incidentally, even if drain oil containing bubbles is drained to the accumulator, the bubbles are not released to the atmosphere, and therefore the bubbles do not easily disappear (or do not disappear). On the other hand, if the drain oil containing bubbles are drained to the oil sumps, the bubbles are released to the atmosphere from the oil sumps, and thus they disappear from within the oil.

As a ninth constitution, it is desirable that in any one of the aforementioned third to eighth constitutions, when a predetermined portion of the first passage which connects the first hydraulic pump and the head side pressure receiving chamber is defined as a first connection point, and a predetermined portion of the second passage which connects the first and second hydraulic pumps and the bottom side pressure receiving chamber is defined as a second connection point, a passage which connects the accumulator and the first connection point be provided, and a first check valve which permits only oil flow to the first connection point be provided in this passage, and that a passage which connects the accumulator and the second connection point be provided, and a second check valve which permits only oil flow to the second connection point be provided in this passage.

According to such a ninth constitution, negative pressure is generated in the first and second passages when the first and second hydraulic pumps are rotated in the mutual variability of volumetric efficiency of the first and second hydraulic pumps and when the hydraulic cylinder is extended/contracted by the external load when the fist and second hydraulic pumps are stopped. However, when the oil pressures of the first and second passages are going to become equal to or lower than a pressure in the accumulator, the first and second check valves are opened to allow the first and second passages to communicate with the accumulator and allow the respective oil pressures of the first and second passages to become the same as the pressure in the accumulator. Accordingly, the occurrence of cavitation and aeration in the first and second passages can be prevented.

As a tenth constitution, it is suitable that in any one of the aforementioned third and eighth constitutions, an on-off valve which allows the second hydraulic pump and the accumulator to be interrupted from each other be provided in a passage from the second hydraulic pump to the accumulator.

According to such a tenth constitution, even if the first and second hydraulic pumps are, for example, gear pumps with a large leakage quantity, the on-off valve stops the oil flow by closing the on-off valve (or a first and a second on-off valve). Thus, the hydraulic cylinder is never extended/contracted by itself by the external load. Incidentally, if the first and second hydraulic pumps are rotated simultaneously with the opening of the on-off valve, the hydraulic cylinder is extended/contracted according to this rotation.

As an eleventh constitution, it is suitable that in any one of the aforementioned third to eighth constitutions, a first on-off valve be provided in the first passage, and that a second on-off valve be provided in the second passage.

Such an eleventh constitution is another aspect example in relation to the tenth constitution.

As a twelfth constitution, it is suitable that in the aforementioned ninth constitution, a first on-off valve be provided between the first hydraulic pump and the first connection point in the first passage, and a second on-off valve is provided between the first and second hydraulic pumps and the second connection point in the second passage, and a third switching valve which includes
a first port opening into a passage leading to the accumulator, a second port opening into a passage leading to a point between the first hydraulic pump and the first on-off valve of the first passage, and a third port opening into a passage leading to a point between the first and second hydraulic pumps and the second on-off valve of the second passage, receives oil pressure Pa of the first passage as pilot pressure at a pressure receiving portion on one end side, on the other hand receives pressure Pb of the second passage as pilot pressure at a pressure receiving portion on the other end side, and which includes
a first position which allows only the first and second ports to communicate with each other in the inside when "Pa<Pb",
a second position which allows only the first and third ports to communicate with each other in the inside when "Pb<Pa",
and a third position which allows all of the first to third ports to be interrupted from one another in the inside when "Pa=Pb", is provided.

In the twelfth constitution, no check valve such as the first and second check valves is provided in the passage leading to the point between the first hydraulic pump and the first on-off valve of the first passage and the passage leading to the point between the first and second hydraulic pumps and the second on-off valve of the second passage. Unless the start and stop of rotation of the first and second hydraulic pumps and the opening and closing of the first or second on-off valve are synchronized, the suction sides of the first and second hydraulic pumps come to have negative pressure, and cavitation and aeration become prone to occur. Even if synchronous control can be easily managed electrical-signally, subtle mechanical synchronization deviation is prone to occur, since mechanical elements such as the electric motor and the first or the second on-off valve are operated by the control. However, the third switching valve of the twelfth constitution allows oil pressures on the suction sides of the first and second hydraulic pumps to have the same pressure, whereby negative pressure is not generated, and hence cavitation and aeration no longer occur.

As a thirteenth constitution, it is desirable that in the aforementioned twelfth constitution, a controller for rotating the electric motor for only a predetermined time in a direction reverse to a designated rotation direction when the rotation of the electric motor is started, and after the predetermined time, rotating the electric motor in the designated rotation direction be provided.

In the explanation of the operation and effects of the twelfth constitution, it is described that synchronous control is performed electrical-signally, and the third constitution embodies this description.

BEST MODE FOR CARRYING OUT THE INVENTION

Preferred embodiments of a hydraulic circuit for driving a hydraulic cylinder according to the present invention will be explained with reference to FIG. 1 to FIG. 29.

Figure 1:
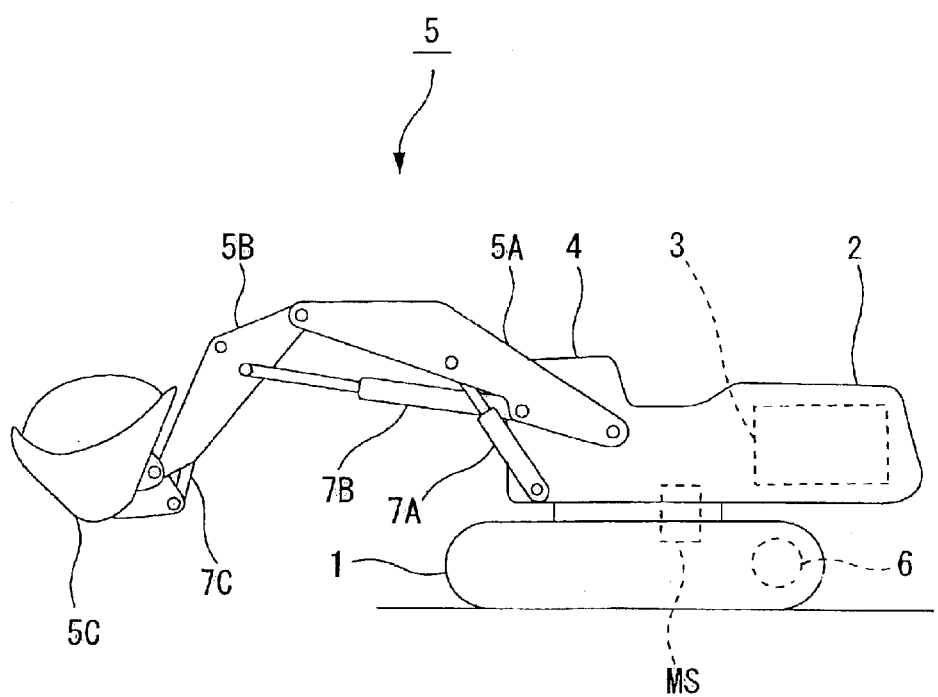
FIG. 1 is a side view of a loading shovel equipped with a first embodiment.

A machine as an example equipped with a first embodiment is a loading shovel in FIG. 1. This loading shovel includes a superstructure 2 rotatably on a base carrier 1, and includes an engine 3, an operator's cab 4, and a working machine 5 on the superstructure 2. The base carrier 1 is allowed to move forward and backward, stop, and operate by hydraulic motors 6 and 6 (hereinafter referred to as "traveling motors 6") provided on both sides respectively. Generally, the superstructure 2 is conventionally allowed to normally and reversely rotate and stop by the hydraulic motors, but in the machine as the example, it is allowed to normally and reversely rotate and stop by an electric motor MS. The working machine 5 is allowed to operate (rise and lower, and bend) by the articulation of a boom 5A, an arm 5B, and a bucket 5C in sequence with the superstructure 2 and the extension/contraction of hydraulic boom cylinders 7A, an arm cylinder 7B, and a bucket cylinder 7C. Incidentally, the engine 3 is used as the power source 3 in this embodiment, but the power source is not limited to this example. As examples of the power source 3, a fuel cell, an external power supply, a battery, and so on can be named.

Figure 2:
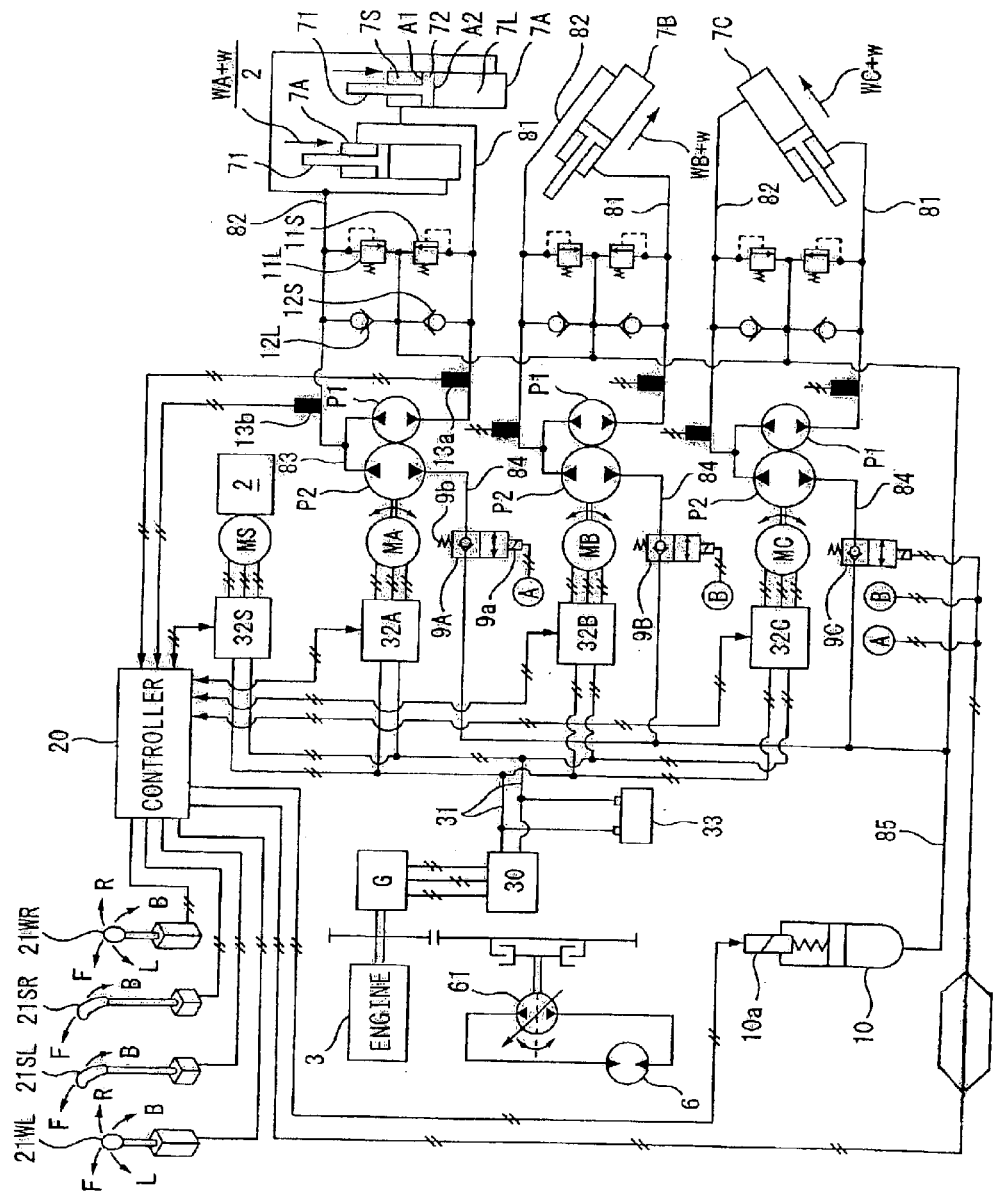
FIG. 2 is a block diagram of the first embodiment.

The first embodiment is as shown in FIG. 2. In FIG. 2, the aforementioned superstructure 2, engine 3, and one of traveling motors 6, electric motor MS, boom cylinders 7A, arm cylinder 7B, and bucket cylinder 7C are included. Unless otherwise distinguished, each of the cylinders 7A to 7C is hereinafter referred to only as "a hydraulic cylinder 7".

The hydraulic cylinders 7 are each a single rod type double acting cylinder in which one end of a rod 71 protrudes outward, and in the first embodiment in which they are different from each other in size, they are driven with similar driving hydraulic circuits as shown in FIG. 2. Therefore, unless otherwise distinguished, a driving hydraulic circuit of the boom cylinders 7A is explained as an example, and as concerns driving hydraulic circuits of the other cylinders 7B and 7C, only the different points will be described.

As shown in FIG. 2, each of head side pressure receiving chambers 7S, which is housed in a tube of the boom cylinder 7A and has a small pressure receiving area A1 of a piston 72 fixedly provided on the other end of the piston rode 71, is connected to a bottom side pressure receiving chamber 7L which has a large pressure receiving area A2 via an oil passage 81, a discharge port and a suction port of a first hydraulic pump P1, and an oil passage 82. Moreover, the oil passage 82 is connected to an accumulator 10 via an oil passage 83, a discharge port and a suction port of a second hydraulic pump P2, an oil passage 84, an on-off valve 9A, and an oil passage 85. Namely, the first hydraulic pump P1 is connected, with a closed circuit, to the head side pressure receiving chambers 7S and the bottom side pressure receiving chambers 7L of the boom cylinders 7A, whereas the second hydraulic pump P2 is connected, with an open circuit, to the bottom side pressure receiving chambers 7L. It should be noted that the accumulator 10 is used as an example of the oil chamber 10 in this embodiment, but the oil chamber 10 is not limited to this example, and any chamber which forms "a chamber having a space which enables inflow and outflow of oil" is usable.

The on-off valve 9A is of a solenoid type. A solenoid 9a is electrically connected to a controller 20, and upon receipt of an exciting current from the controller 20, opens the on-off valve 9A against urging force of a spring 9b and allows the oil passages 84 and 85 to communicate with each other. On the other hand, when an exciting current is not received (including a case where the machine as the example is not used), the on-off valve 9A is closed by the urging force of the spring 9b, and the oil passages 84 and 85 do not communicate with each other. Incidentally, the driving hydraulic circuits of the other cylinders 7B and 7C similarly include on-off valves 9B and 9C. Unless otherwise distinguished, each of the on-off valves 9A to 9C is hereinafter referred to only as "an on-off valve 9".

The accumulator 10 is electrical-signally connected to the controller 20, and includes a solenoid-operated actuator 10a which receives the exciting current from the controller 20 and lowers the maximum operating pressure (which is "the upper limit pressure at the completion of the accumulation of pressure") from a high pressure of 3 MPa ($\approx$30 kg/cm2) to a low pressure of 2 MPa ($\approx$20 kg/cm2) as the exciting current increases. It should be noted that the minimum operating pressure (which is "the lower limit pressure at the start of the accumulation of pressure") of the accumulator 10 is approximately 1.7 MPa ($\approx$17 kg/cm2) irrespective of changes in maximum operating pressure.

Incidentally, the oil passage 81 is connected to the oil passage 85 via a first safety valve 11S and a first check valve 12S which are arranged in parallel. Similarly, the oil passage 82 is connected to the oil passage 85 via a second safety valve 11L and a second check valve 12L which are arranged in parallel.

The first safety valve 11S opens when the oil pressure in the oil passage 81 rises to a set pressure of 34 MPa ($\approx$350 kg/cm2) of the first safety valve 11S and allows the oil passage 81 to communicate with the oil passage 85, thereby preventing the occurrence of abnormal pressure (pressure higher than 34 MPa ($\approx$350 kg/cm2)) in the oil passage 81.

Similarly, the second safety valve 11L opens when the oil pressure in the oil passage 82 rises to a set pressure of 34 MPa ($\approx$350 kg/cm2) of the second safety valve 11L and allows the oil passage 82 to communicate with the oil passage 85, thereby preventing the occurrence of abnormal pressure (pressure higher than 34 MPa ($\approx$350 kg/cm2)) in the oil passage 82.

The first check valve 12S permits only oil flow from the oil passage 85 to the oil passage 81, and the second check valve 12L permits only oil flow from the oil passage 85 to the oil passage 82. Namely, both the check valves 12S and 12L prevent the occurrence of negative pressure and a vacuum in both the oil passages 81 and 82.

Moreover, the oil passage 81 includes a first oil pressure detector 13a, and the oil passage 82 includes a second oil pressure detector 13b. Both the oil pressure detectors 13a and 13b are electrical-signally connected to the controller 20 and detect oil pressure information on both the oil passages 81 and 82 and input it to the controller 20. It should be noted that the driving hydraulic circuits of the other respective cylinders 7B and 7C also include the first and second oil pressure detectors 13a and 13b (the details thereof are not shown).

The first and second hydraulic pumps P1 and P2 are of a fixed displacement type, and both are direct-coupled to an output shaft of an electric motor MA (or both are direct-coupled thereto via a speed reducer not shown) and normally and reversely rotate by normal and reverse rotations of the electric motor MA. Incidentally, as shown in FIG. 2, the driving hydraulic circuits of the other hydraulic cylinders 7B and 7C similarly include electric motors MB and MC. Unless otherwise distinguished, each of the electric motors MS and MA to MC is hereinafter referred to only as "an electric motor M".

The electric motors M use a generator G driven by the engine 3 as a main generator. The generator G and the electric motors M are of a three-phase alternating current type. The generator G generates voltage which is proportional to engine speed and the magnitude of an exciting current to a rotor coil (not shown) of the generator G respectively. In the first embodiment, a first voltage regulator (not shown), which the generator G always includes, regulates the exciting current to thereby allow the generator G to generate a predetermined voltage. A generated three-phase alternating current is converted into a DC constant voltage V1 by a first rectifier 30, and this voltage V1 is applied to respective inverters 32S and 32A to 32C provided in the electric motors M via power lines 31. Incidentally, unless otherwise distinguished, each of the inverters 32S and 32A to 32C is hereinafter referred to only as "an inverter 32".

The inverter is simply "a converter from DC to AC", but in recent years, it performs various functions. Hence, the inverters 32 in the first embodiment perform the following functions in synchronization with the controller 20.

As a first function, the inverters 32 returns DC to a three-phase alternating current, and as a second function, the inverters 32 are electrical-signally connected to the controller 20 and perform frequency control, magnitude control, direction control, and so on for an electric current to stator coils (not shown) of the electric motors M in accordance with command signals from the controller 20, which allows the normal and reverse rotations, engine speed, and stop of the electric motors M based on the command signals from the controller 20.

Incidentally, the controller 20 includes a so-called micon and a current generator for generating a solenoid driving current to be sent to each of solenoids, which are described later in detail, in response to a command from the micon. It should be noted that since the inverters 32 each are a kind of controller, the inverters 32 may be constructed integrally in the controller 20. In this embodiment, in order to use the existing controller 20 and the existing inverters 32 for the machine as the example and enable communication between them, they are upgraded. Incidentally, an operation program, which is described later in detail and stored in the controller 20 and the inverters 32, for operating various kinds of actuators such as a solenoid is peculiar to this embodiment.

A third and a fourth function are as follows. Namely, the electric motors M each include a second voltage regulator (not shown) for regulating an exciting current to its rotor coil (not shown) likewise with the first voltage regulator of the generator G. Although its details are described later, supposing that the first and second hydraulic pumps P1 and P2 are reversely driven by external loads, and that the superstructure 2 rotates until a stop by inertial force during braking of the superstructure 2, the electric motors M generate electricity. Then, as the third function, the inverters 32 detect the generation of electricity. As the fourth function, in order that the electric motors M each generate a three-phase alternating current, the second voltage regulators of the electric motors M each regulate an exciting current to be generated.

The details thereof are as follows.

The inverters 32 each have a circuit (not shown) for returning DC to a three-phase alternating current in order to fulfill the first function, and include a second rectifier (not shown) in parallel with the circuit. The power lines 31 include a storage battery 33 as a secondary battery in parallel with the first rectifier 30 and the second rectifier. It should be noted that both the rectifiers are each a well-known combination system of six diodes and permit only the flow of an electric current to the power lines 31.

More specifically, as a fifth function, the inverters 32 each allow the second rectifier to rectify the three-phase alternating current generated when the electric motors M generate electricity to a DC constant voltage V2, and this voltage V2 is applied to the storage battery 33 via the power lines 31. Here, charging conditions of the storage battery 33 are "V2>V1" in the first place and "the storage battery 33 is insufficiently charged" in the second place. When these charging conditions are fulfilled, electricity generated by the electric motors M is charged into the storage battery 33.

Namely, when some inverter 32 detects the generation of electricity by its electric motor M by means of the third function, the fourth function of the inverters 32 allows the second voltage regulator of the electric motor M to regulate an exiting current to the rotor coil of the electric motor M in order that the second rectifier outputs the DC constant voltage V2 satisfying "V2>V1" (for example, if "V1=100 V", "V2=200 V") to fulfill the fifth function of the second rectifier.

More specifically, as described above, the controller 20 is free to input respective exciting currents to the solenoid 9a of each of the on-off valves 9 and the solenoid-operated actuator 10a of the accumulator 10, and free to input respective pieces of oil pressure information from the first and second hydraulic detectors 13a (three) and 13b (three) and to input command signals to the inverters 32. Moreover, the controller 20 is electrical-signally connected to a tilt angle detector (not shown) provided in each of tilting directions F, B, L, and R (F is forward tilting, B is backward tilting, L is left tilting, and R is right tilting) of a left working machine operating lever 21WL and a right working machine operating lever 21WR which are placed in the operator's cab 4 and to a tilt angle detector (not shown) provided in each of tilting directions F and B of a left traveling operating lever 21SL and a right traveling operating lever 21SR, and inputs operation signals (signals of tilting directions and tilting angles θ) of the respective operating levers. Unless otherwise distinguished, each of the operating levers is hereinafter referred to only as "an operating lever 21".

The left working machine operating lever 21WL performs right rotation (normal rotation of the electric motor MS and rightward rotation of the superstructure 2 when viewed from the operator's side) by the forward tilting F, left rotation (reverse rotation of the electric motor MS and leftward rotation of the superstructure 2 when viewed from the operator's side) by the backward tilting B, arm excavation (arm raising by the extension of the arm cylinder 7B) by the right tilting R, arm dump (arm lowering by the contraction of the arm cylinder 7B) by the left tilting L, and stops of the electric motor MS and the arm cylinder 7B at its neutral position.

The right working machine operating lever 21WR performs boom down (boom lowering by the contraction of the boom cylinders 7A) by the forward tilting F, boom up (boom raising by the extension of the boom cylinders 7A) by the backward tilting B, bucket dump (downward rotation of the bucket by the contraction of the bucket cylinder 7C) by the right tilting R, bucket excavation (upward rotation of the bucket by the extension of the bucket cylinder 7C) by the left tilting L, and stops of the boom cylinders 7A and the bucket cylinder 7C at its neutral position.

The left traveling operating lever 21SL performs a left forward movement (normal rotation of the left traveling motor 6) by the forward tilting F, a left backward movement (reverse rotation of the left traveling motor 6) by the backward tilting B, and a stop of the left traveling motor 6 at its neutral position. The right traveling operating lever 21SR performs a right forward movement (normal rotation of the right traveling motor 6) by the forward tilting F, a right backward movement (reverse rotation of the right traveling motor 6) by the backward tilting B, and a stop of the right traveling motor 6 at its neutral position.

Then, the controller 20 previously stores in a memory (not shown)

"the operation program" which will be described later in detail,

"the solenoids 9a of the on-off valves 9 (9A to 9C) corresponding to the respective tilt angle detectors and the inverter 32S", "the inverters 32 corresponding to the respective tilting directions F, B, L, and R of the respective tilt angle detectors and their normal/reverse rotation command signals", "a matrix (and/or respective functions) of magnitudes of normal/reverse rotation command signals corresponding to the respective magnitudes of tilt angles θ detected by the respective tilt angle detectors", "each matrix (and/or each function) of the magnitude of an exciting current to the solenoid-operated actuator 10a of the accumulator 10 which increases with an increase in the magnitudes of the respective tilt angles θ of the left tilting L (arm lowering) of the left working machine operating lever 21WL, and the forward tilting F (boom lowering) and the right tilting R (downward rotation of the bucket) of the right working machine operating lever 21WR", and "a relief equivalent pressure of 32 MPa (325 kg/cm2) which will be described later in detail".

The aforementioned "operation program" will be explained. Incidentally, the machine as the example, in an operating condition of the engine 3, repeats the acts of stopping after being self-propelled to a position just opposite a rock wall or the like, excavating the rock wall or the like while scooping it up with the working machine 5, and dumping (which means "dropping and loading") excavations, for example, into a dump truck or the like which is standing by the side of the machine as the example while correctly adjusting the attitude of the working machine 5 (performs a so-called "loading operation"). The operation program concerning only the boom cylinders 7A (up movement (raising), holding (stop), and down movement (lowering) of the boom 5A) will be shown as an example below.

First, the operator actuates the engine 3. Thereby, when the storage battery 33 is insufficiently charged, the storage battery 33 starts charging based on the DC constant voltage V1.

(a) Boom up (boom raising) is as follows.

The operator gives backward tilting B to the right working machine operating lever 21WR, the tilt angle detector of the right working machine operating lever 21WR inputs the backward tilt angle θ to the controller 20. The controller 20 reads "the solenoid 9a of the on-off valve 9A corresponding to the tilt angle detector of the right working machine operating lever 21WR" from the memory and feeds an exciting current to the solenoid 9a to open the on-off valve 9A to allow the oil passages 84 and 85 to communicate with each other. Simultaneously, the controller 20 reads "the inverter 32A corresponding to the backward tilting B and its normal rotation command signal" from the memory and reads "the magnitude of the normal rotation command signal corresponding to the magnitude of the backward tilt angle θ" from the matrix (and/or respective functions) of the memory, and inputs the normal rotation command signal with the magnitude corresponding to the backward tilt angle θ to the inverter 32A. Upon receipt of the normal rotation command signal, the inverter 32A performs frequency control, current magnitude control, and/or current direction control according to the normal rotation command signal and its magnitude for the three-phase alternating current returned from DC (the first function) to normally rotate the electric motor MA at a speed corresponding to the magnitude of the normal rotation command signal (the second function). By the normal rotation of the electric motor MA, both the first and second hydraulic pumps P1 and P2 direct-coupled to the electric motor MA (or direct-coupled thereto via the speed reducer not shown) normally rotate. Hence, the first hydraulic pump P1 sucks oil in the head side pressure receiving chambers 7S of the boom cylinders 7A from the oil passage 81 and discharges it to the oil passage 82. Simultaneously, the second hydraulic pump P2 sucks pressure oil in the accumulator 10 via the oil passage 85, the on-off valve 9A, and the oil passage 84 and discharges it to the oil passage 83. The oil discharged to the oil passage 83 merges with the oil discharged from the first hydraulic pump P1 in the oil passage 82 and flows into the bottom side pressure receiving chambers 7L. Thus, the boom cylinders 7A are extended, and the boom 5A moves up.

(b) Boom holding (boom stop) is as follows.

When the operator sets the right working machine operating lever 21WR at a neutral position, the tilt angle detector stops input signals to the controller 20. Since the inverter 32A does not receive any signal from the controller 20, an exciting current to the rotor coil of the electric motor MA is interrupted, so that the electric motor MA becomes free to rotate (Incidentally, a drive current to the stator coil (not shown) of the electric motor MA may be interrupted). At the same time, an exciting current to the solenoid 9a is interrupted, and the on-off valve 9A is closed, thereby causing an interruption between the oil passages 84 and 85. Because of the interruption between these oil passages 84 and 85 (a first reason) and moreover non-occurrence of inflow/outflow of oil between the both chambers 7S and 7L due to "(volume of the head side pressure receiving chamber 7S)<(volume of the bottom side pressure receiving chamber 7L)" in each of the boom cylinder 7A (a second reason), the flow of oil in the oil passages 81 and 82 is stopped. Accordingly, the boom cylinders 7A stop, and a natural lowering of the boom 5A based on internal leakage of oil due to an empty weight WA of the working machine 5 no longer occurs. Namely, the boom 5A stops.

(c) Boom down (boom lowering) is as follows.

When the operator gives the forward tilting F to the right working machine operating lever 21WR, the tilt angle detector of the right working machine operating lever 21WR inputs the forward tilt angle θ to the controller 20. The controller 20 reads "the solenoid 9a of the on-off valve 9A corresponding to the tilt angle detector of the right working machine operating lever 21WR" from the memory and feeds an exciting current to the solenoid 9a to open the on-off valve 9A to allow the oil passages 84 and 85 to communicate with each other. Simultaneously, the controller 20 reads "the inverter 32A corresponding to the forward tilting F and its reverse rotation command signal" from the memory and reads "the magnitude of the reverse rotation command signal corresponding to the magnitude of the forward tilt angle $\theta$" from the matrix (and/or respective functions) of the memory, and inputs the reverse rotation command signal with the magnitude corresponding to the forward tilt angle $\theta$ to the inverter 32A. Upon receipt of the reverse rotation command signal, the inverter 32A performs frequency control, current magnitude control, and/or current direction control according to the reverse rotation command signal and its magnitude for the three-phase alternating current returned from DC (the first function) to reversely rotate the electric motor MA at a speed corresponding to the magnitude of the reverse rotation command signal (the second function). By the reverse rotation of the electric motor MA, both the first and second hydraulic pumps P1 and P2 direct-coupled to the electric motor MA (or direct-coupled thereto via the speed reducer not shown) reversely rotate. Hence, the first hydraulic pump P1 sucks oil in the bottom side pressure receiving chambers 7L of the boom cylinders 7A from the oil passage 82 and discharges it to the oil passage 81 and leads it to the head side pressure receiving chambers 7S. Simultaneously, the second hydraulic pump P2 sucks oil from within the bottom side pressure receiving chambers 7L via the oil passage 82 and the oil passage 83, discharges it to the oil passage 84, leads it to the accumulator 10 via the on-off valve 9A and the oil passage 85, and allows the accumulator 10 to accumulate it therein. Thus, the boom cylinders 7A are contracted, and the boom 5A moves down. It should be noted that to simplify the following explanation, this (c) is defined as "boom lowering performed by electrically driving the electric motor MA".

Incidentally, the machine as the example is a loading shovel. Accordingly, boom down (lowering) during an excavating operation is brought about by the contraction of the boom cylinders 7A first by the empty weight WA of the working machine 5 and a weight w of excavations in the bucket 5C. Hence, "boom lowering performed by electrically driving the electric motor MA" in the aforementioned (c) is limited to a case where the boom cylinders 7A are contracted at a speed higher than the contraction speed of the boom cylinders 7A by the empty weight WA of the working machine 5 and the weight w of the excavations in the bucket 5C (but such a case almost never occurs in actuality), or a case where the easy performance of a maintenance operation, for example, for the lower portion of the machine as the example is tried by lifting the working machine side of the machine as the example by touching the bucket 5C to the ground and contracting the boom cylinders 7A, for example. This applies to the case of the contraction of the arm cylinder 7B (arm lowering) by the arm 5B, the bucket 5C, and an empty weight WB of the bucket cylinder 7C and the weight w of the excavations in the bucket 5C and the case of the contraction of the bucket cylinder C (bucket lowering) by an empty weight WC of the bucket 5C and the weight w of excavations in the bucket 5C. It should be noted that each of the aforementioned "WA+w", "WB+w", and "WC+w" is hereinafter referred to as "a working machine empty weight W".

(d) More specifically, as described above, actually the boom lowering during the excavating operation by the machine as the example is first brought up by the contraction of the boom cylinders 7A by the working machine empty weight W. Therefore, the first and second hydraulic pumps P1 and P2 are reversely driven by the contraction of the boom cylinders 7A, and the electric motor MA is also reversely driven. In other words, even if the operator gives the forward tilting F to the right working machine operating lever 21WR and thereby the electric motor MA is going to reversely rotate at a speed corresponding to the magnitude of the reverse rotation command signal from the controller 20 as explained in the aforementioned (c), since the electric motor MA is reversely driven by the first and second hydraulic pumps P1 and P2, a drive current based on the DC voltage V1 does not flow to the electric motor MA even if the DC voltage V1 is applied from the generator G side, and conversely the electric motor MA generates electricity.

Supposing here that the storage battery 33 is insufficiently charged (Incidentally, the charging amount of the storage battery 33 relates to charging time, but does not directly relate to charging voltage), the DC constant voltage V2 based on the generation of electricity by the electric motor MA is higher than the DC constant voltage V1 which has passed through the first rectifier 30 (V2>V1), and hence the storage battery 33 starts charging by the DC constant voltage V2. Namely, the storage battery 33 is charged by the voltage V1 based on the generator G and in addition charged by the voltage V2 by the electric motor M.

Incidentally, if the boom lowering depends only on the contraction of the boom cylinders 7A by the working machine empty weight W as in the aforementioned (d), the operator cannot control the contraction speed even if the storage battery 33 is sufficiently charged (which causes so-called "runaway"). Hence, the boom lowering speed in the first embodiment is controllable as described later, and thereby the occurrence of runaway is prevented. Incidentally, as is commonly known, the runaway means that the actuator operates by the working machine empty weight W and inertial force even under the control of the operator (hereinafter the same as above).

More specifically, the accumulator 10 includes the solenoid-operated actuator 10a which is electrical-signally connected to the controller 20, receives an exiting current from the controller 20, and lowers the maximum operating pressure from a high pressure of 3 MPa ($\approx$30 kg/cm2) to a low pressure of 2 MPa ($\approx$20 kg/cm2) as the exiting current increases. Namely, the boom lowering speed is controllable as follows, based on the manipulated variable (forward tilt angle $\theta$) of the right working machine operating lever 21WR by the operator.

As the operator gives the forward tilting F to the right working machine operating lever 21WR and increases its forward tilt angle $\theta$, the controller 20 reads "the magnitude of the exiting current to the solenoid-operated actuator 10a which increases with an increase in the magnitude of the tilt angle $\theta$" from the matrix and/or the function of the memory and increases the exciting current to the solenoid-operated actuator 10a. Thus, the maximum operating pressure changes from the high pressure of 3 MPa ($\approx$30 kg/cm2) to the low pressure of 2 MPa ($\approx$20 kg/cm2). The larger the forward tilt angle $\theta 1$ the smaller the maximum operating pressure of the accumulator 10 against the contraction force of the boom cylinders 7A by the working machine empty weight W becomes. Accordingly, oil in the bottom side pressure receiving chambers 7L of the boom cylinders 7A can easily flow into the accumulator 10 via the second hydraulic pump P2 and the on-off valve 9A (Moreover, oil in the bottom side pressure receiving chambers 7L can also easily flow into the head side pressure receiving chambers 7S via the first hydraulic pump P1). Namely, the boom lowering speed is controlled based on the manipulated variable (forward tilt angle $\theta$) of the right working machine operating lever 21WR by the operator.

It should be noted that such boom lowering speed control is applied similarly to lowering speed control of the arm 5B and the bucket 5C in the first embodiment. This is evident from "each matrix (and/or each function) of the magnitude of the exciting current to the solenoid-operated actuator 10a of the accumulator 10 which increases with an increase in the magnitudes of the respective tilt angles θ by the left tilting L (arm lowering) of the left working machine operating lever 21WL and the right tilting R (downward rotation of the bucket) of the right working machine operating lever 21WR".

Incidentally, during the excavating operation, abnormal pressure, negative pressure, and a vacuum occur frequently in the head side and bottom side pressure receiving chambers 7S and 7L of the hydraulic cylinders 7. For example, if abnormal pressure occurs in the head side pressure receiving chambers 7S (or the bottom side pressure receiving chambers 7L) of the hydraulic cylinders 7, negative pressure (or a vacuum) occurs in the bottom side pressure receiving chambers 7L (or the head side pressure receiving chambers 7S) on the opposite side. At this time, the first and second check valves 12S and 12L prevent the negative pressure (or the vacuum), whereas the safety valves 11S and 11L prevent the occurrence of the abnormal pressure (34 MPa or higher (≈350 kg/cm2 or higher)).

Incidentally, when receiving information on oil pressure equal to or higher than the relief equivalent pressure of 32 MPa (≈325 kg/cm2) which is previously stored in the memory from the first oil pressure detectors 13a or the second oil pressure detectors 13b during tilting of the operating levers 21, the controller 20 of the machine as the example inputs a shift signal (which is "an interrupt signal") to the previously explained "holding" in the aforementioned (b) to the corresponding inverters 32 irrespective of the operation (system) of the operating levers 21 and their manipulated variables (tilt angles θ). It should be noted that the safety valves 11S and 11L operate even when the operating levers 21 are not operated, although the set pressure of 34 MPa (≈350 kg/cm2) of the aforementioned safety valves 11S and 11L are prescribed in addition to the relief equivalent pressure of 32 MPa (≈325 kg/cm2) in the first embodiment. Moreover, the safety valves 11S and 11L absorb an accidental response delay concerned with a shift from rotation to holding of the electric motor MA by the controller.

The traveling motors 6 and 6 constitute a closed circuit with normal/reverse inversion-type variable displacement hydraulic pumps 61 and 61. Namely, when the left traveling operating lever 21SL and/or the right traveling operating lever 21SR is given the forward tilting F or the backward tilting B, the tilt angle θ from the tilt angle detector controls a servo valve for changing the volume of its hydraulic pump 61 via the controller 20, whereby the hydraulic pump 61 discharges oil with a displacement corresponding to the magnitude of the tilt angle θ in a discharge direction according to the tilting direction F (or B) to rotate the traveling motors 6 and 6 normally or reversely at a free speed.

The operation and effects of the aforementioned first embodiment will be listed in items. It should be noted that the previously explained operation and effects are omitted except necessary ones to avoid repeated explanation.

According to the first embodiment, when the boom 5A, the arm 5B, and the bucket 5C are lowered, hydraulic energy based on the working machine empty weight W is accumulated as hydraulic energy in the accumulator 10 and stored as electric energy in the storage battery 33. More specifically, according to the aforementioned first embodiment, energy hitherto abandoned is recovered. The recovered energy is reused when any, or two or more of the boom 5A, the arm 5B, and the bucket 5C are raised (so-called "energy regeneration" occurs). Incidentally, since the machine as the example is the loading shovel, its excavating operation mode is a repetitive operation of raising to lowering and lowering to raising of the boom 5A, the arm 5B, and the bucket 5C. Namely, in the excavating operation, the recovery and reuse of energy occur alternately, and hence the regeneration of energy can be performed without waste. The details thereof are as follows.

(A) Regeneration of Hydraulic Energy Accumulated in the Accumulator 10

Pump torque is proportional to differential pressure (=discharge pressure−suction pressure) between discharge pressure and suction pressure. The "suction pressure" corresponds here to pressure accumulated in the accumulator 10, and hence the pump torque can be reduced by internal pressure in the accumulator 10 at the time of raising. Namely, allowance is produced correspondingly to torque resistance (mechanically speaking, "rigidity") of the first and second hydraulic pumps P1 and P2 and the electric motors M, and moreover the engine 3 and the like can be reduced in output (reduced in size).

(B) Regeneration (Namely "Discharge") of Electric Energy Stored in the Storage Battery 33

The voltage V2 in the storage battery 33 stored at the time of lowering is higher than the voltage V1 from the generator G (V2>V1). Accordingly, at the beginning of raising in the case of raising, the accumulator 33 discharges electricity to drive the electric motors M. While the voltage is lowered from the voltage V2 to the voltage V1 by the discharge of electricity, the generator G generates only the voltage V1, and its current does not flow. In other words, during this time, the engine 3 runs without a load in relation to the raising of the boom 5A, the arm 5B, and the bucket 5C. Further, the beginning of raising means the time of startup at which high torque (high current) is required for the electric motors M. Namely, the generator G (that is, the engine 3) bears medium/low torque (medium/low current) range of the electric motors M after or almost at the completion of startup. Accordingly, not only the generator G but also the engine 3 and the like can be reduced in output (that is, reduced in size).

(C) Conventionally, by providing a counterbalance valve additionally for an actuator (hydraulic cylinder, hydraulic motor) which receives the working machine empty weight W and inertial force, runaway due to the working machine empty weight W and the inertial force is prevented. As is commonly known, the counterbalance valve is a valve which allows the actuator to operate from when the back pressure of the actuator becomes higher than the oil pressure based on the working machine empty weight W and the inertial force. In the aforementioned first embodiment, however, since the first and second hydraulic pumps P1 and P2 themselves can interrupt the flow of oil resulting from the runaway, the lowering speed can be controlled by only the rotation control of the first and second hydraulic pumps P1 and P2 without additionally providing the counterbalance valve, whereby runaway does not occur (however, in this first embodiment, as described above, the maximum operating pressure of the accumulator 10 is made changeable, whereby the lowering speed is controlled). Moreover, the pressure control such that "the back pressure of the actuator is made higher than the oil pressure based on the working machine empty weight W and the inertial force" required for the counterbalance valve is unnecessary, and correspondingly, a loss of hydraulic energy can be reduced. Needless to say, correspondingly, an economic effect is remarkably produced since the counterbalance valve becomes unnecessary.

(D) When receiving information on oil pressure equal to or higher than the previously stored relief equivalent pressure of 32 MPa (approximately 325 kg/cm2 or higher) from the first oil pressure detectors 13a or the second hydraulic pressure detectors 13b during tilting of the operating levers 21, the controller 20 inputs the sift signal to a "holding" state explained in the aforementioned (b) to the inverters 32 concerned irrespective of the manipulated variables (tilt angles θ) of the operating levers 21. Therefore, while the operating levers 21 are operated, a relief loss is not produced or can be ignored. In other words, the fuel economy of the engine 3 is improved, and the temperature of oil no longer increase easily, whereby the machine as the example can be operated with a small quantity of oil.

(D1) No relief loss is produced during the operation of the operating levers 21. Namely, when, for example, a crane truck or the like in which relief pressure seldom occurs is used as the machine as the example, both the oil pressure detectors 13a and 13b and control program relationship in the controller 20 concerned with both the oil pressure detectors 13a and 13b may be deleted.

Incidentally, the control program relationship means the deletion of "the relief equivalent pressure of 32 MPa (≈325 kg/cm2)" from the memory, the deletion of the comparison of the relief equivalent pressure of 32 MPa (≈325 kg/cm2) and the oil pressure information from the first and second oil pressure detectors 13a and 13b and the input of the sift signal to "the holding" into the inverters 32 based on the result of the comparison, and the like.

(D2) Further, also in the machine as the example, both the oil pressure detectors 13a and 13b and the control program relationship in the controller 20 may be deleted. In this case, the safety valves 11S and 11L come to function as relief valves. Needless to say, in this case, relief valves with pressures lower than the set pressures of the safety valves 11S and 11L may be provided respectively in parallel with the safety valves 11S and 11L.

(D3) Furthermore, the relief pressure function can be attained by only the control program in the controller 20 or the inverters 32 without the first and second oil pressure detectors 13a and 13b. In other words, it is recommended that the drive torques of the electric motors M each equal to the product value of predetermined relief pressures for the passages 81 and 82 and the sum of respective displacements per one rotation of the first and second hydraulic pumps P1 and P2 be the maximum drive torques. Namely, when the drive torques of the electric motors M reach the maximum drive torques, the controller 20 or the inverters 32 stop the electric motors M. In so doing, even if the relief pressure is to occur in the passages 81 and 82, the relief pressure does not occur since the electric motors M are stopped. Incidentally, on this occasion, it is recommended to additionally provide an annunciator which gives an alarm or makes an illuminated sign and inform the operator on the outside that the current state is in a state just before the occurrence of the relief pressure. Incidentally, this program for preventing the occurrence of the relief pressure does not fulfill its function only during the rotation of the electric motors M. Hence, the relief control during the stop of the electric motors M can be performed by the safety valves 11S and 11L. Incidentally, since the maximum vales of drive torques of the electric motors M can be freely set, that is, be changeable, the variable relief control also can be performed easily, flexibly, and economically. Moreover, the relief pressure can be set by only the control program, and therefore, it is possible to set the passages 81 at a first relief pressure suitable therefor and set the passages 82 at a second relief pressure suitable therefor with a value different from the first relief pressure. Of course, either one or both of the first and second relief pressures may be made variable. Individual control for the first and second relief pressures is also flexible, whereby there arises flexibility that this embodiment can appropriately cope with the unknown future configuration and usage of the machine.

A second embodiment will be explained with reference to FIG. 3 and FIG. 4. It should be noted that the explanation be given with particular emphasis on points different from the aforementioned first embodiment.

Figure 3:
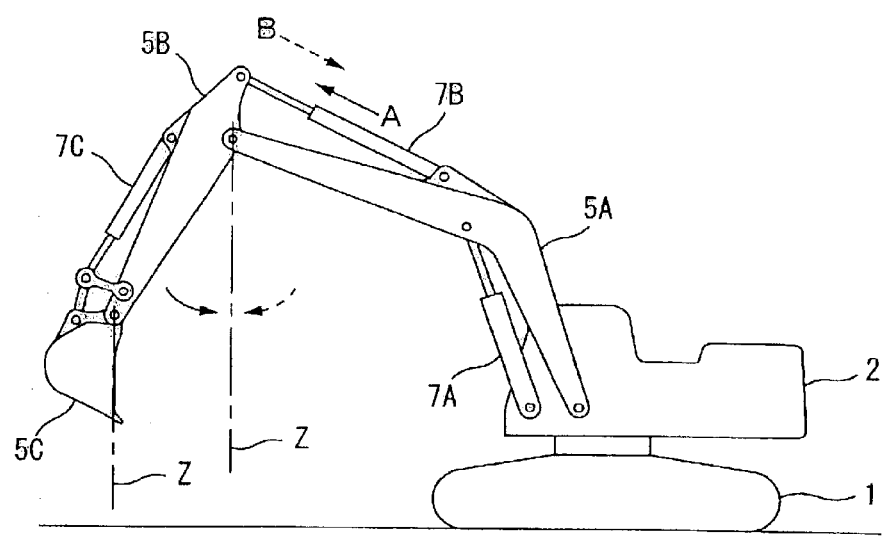
FIG. 3 is a side view of a backhoe shovel equipped with a second embodiment.
Figure 4:
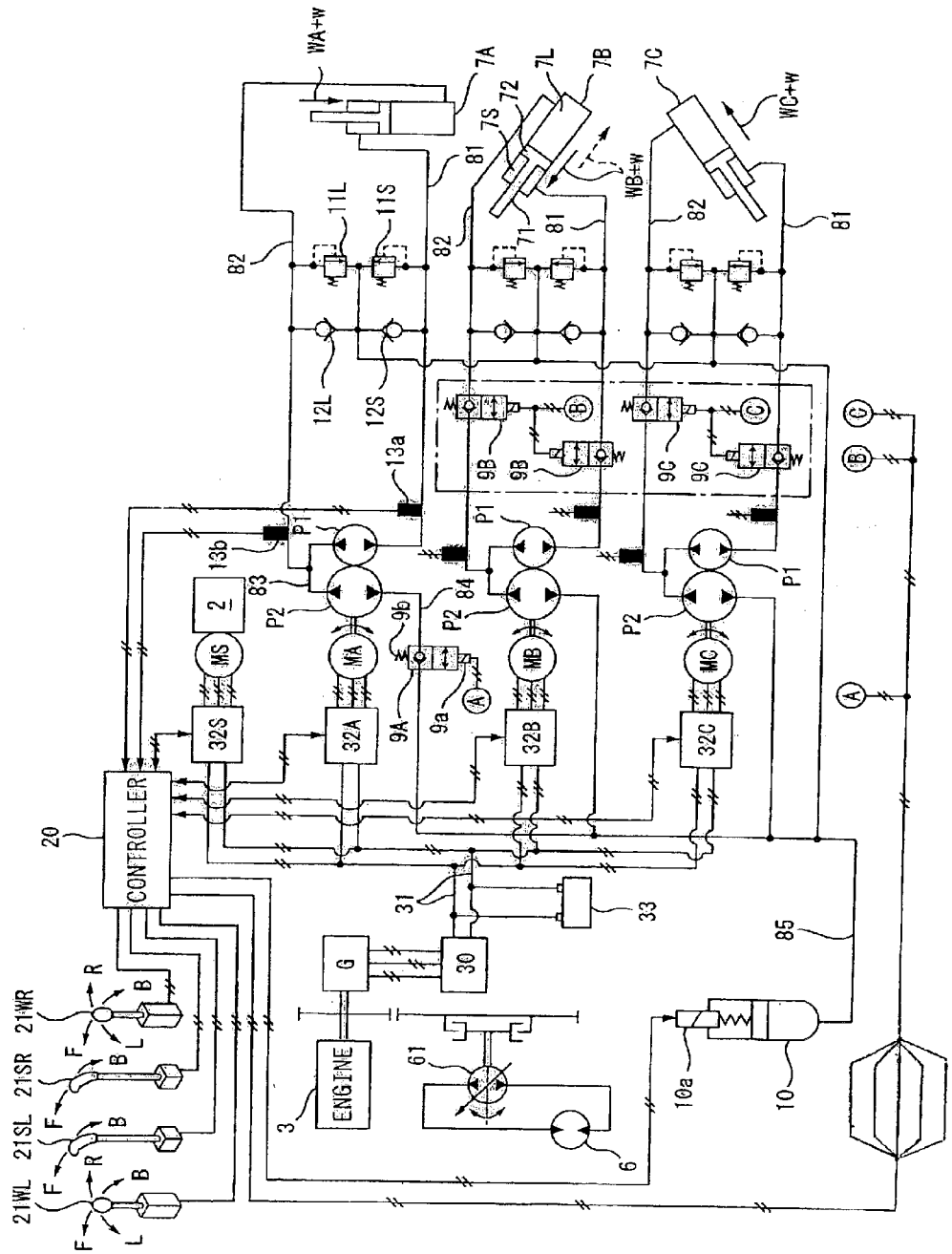
FIG. 4 is a block diagram of the second embodiment.

A machine as an example equipped with a second embodiment in FIG. 4 is a backhoe shovel in FIG. 3 which is different from the loading shovel equipped with the aforementioned first embodiment. In the second embodiment, the on-off valves 9B and 9C provided between the oil passages 84 and 85 in FIG. 2 in the aforementioned first embodiment are removed, and instead, as shown in a frame enclosed by a chain line in FIG. 4, each one on-off valve 9 (9B, 9B, 9C, 9C) is provided in the oil passage 81 and the oil passage 82 of the driving hydraulic circuit of each of the hydraulic cylinders 7B and 7C. In more detail, one on-off valve (9B, 9C) is provided on the first hydraulic pump P1 side of the first check valve 12S in each oil passage 81, and one on-off valve (9B, 9C) is provided on the second hydraulic pump P2 side of the second check valve 12L in each oil passage 82. The reason why they are thus provided (namely, operation and effects) is as follows.

As shown in FIG. 3, a base end portion of the arm 5B of the backhoe shovel as the machine as the example is coupled to the forward end of the boom 5A by a horizontal pin (pin in a vertical direction in the drawing), and the arm 5B performs an alternate swing operation in forward and backward directions (right and left directions in the drawing) with respect to a plumb line Z passing through the center of the pin. Namely, when the arm 5B is located on the front side (on the left side in the drawing) of the plumb line Z, the working machine empty weight W (W=WB+w in this case) acts in the extending direction (direction shown by a full line arrow A) of the arm cylinder 7B. On the other hand, although not shown, when the arm 5B is located on the back side (on the right side in the drawing) of the plumb line Z, the working machine empty weight W (=WB+w) acts in the contracting direction (direction shown by a dotted line arrow B) of the arm cylinder 7B. Incidentally, this alternate swing operation is the same also in the bucket 5C whose base end portion is coupled to the forward end of the arm 5B by a horizontal pin (pin in a vertical direction in the drawing) and which performs the alternate swing operation in forward and backward directions (right and left directions in the drawing) with respect to the plumb line Z passing through the center of the pin. Accordingly, the bucket 5C is regarded as having been provided by the explanation of the arm 5B, and the repeated explanation thereof is omitted.

More specifically, if in the arm cylinder 7B of the backhoe shovel, the on-off valve 9B is provided between the oil passages 84 and 85 as in the aforementioned first embodiment, the working machine empty weight W acts to allow the arm cylinder 7B to extend in the direction shown by the full line arrow A shown in FIG. 4 when the arm 5B is located on the front side of the plumb line Z. Namely, it acts to lead oil in the head side pressure receiving chamber 7S to the second hydraulic chamber 7L via the oil passage 81, the first hydraulic pump P1, and the oil passage 82 in this order to allow the arm cylinder 7B to extend. Since "(volume of the head side pressure receiving chamber 7S)<(volume of the bottom side pressure receiving chamber 7L)" holds here, oil in the bottom side pressure receiving chamber 7L is in short supply and intends to sift to the negative pressure side, but at this time, the second check valve 12L opens and leads pressure oil in the accumulator 10 to the bottom side pressure receiving chamber 7L to make up for the shortage of oil, thereby deterring the shift to the negative pressure side. To be more specific, if the respective on-off valves 9B and 9C are provided between the oil passages 84 and 85 as in the aforementioned first embodiment in the arm cylinder 7B and the bucket cylinder 7C of the backhoe shovel, and the arm 5B and the bucket 5C are located on the front sides of the plumb lines Z, the arm cylinder 7B and the bucket cylinder 7C extend by themselves until the centers of gravity of the arm 5B and the bucket 5C reach positions on the plumb lines Z, whereby they cannot be held in fixed positions on the front sides of the plumb lines Z (so-called "natural lowering of the arm 5B and the bucket 5C" occurs).

Incidentally, the arm 5B and/or the bucket 5C is located on the back side of the plumb line Z, the working machine empty weight W acts in the contracting direction (direction shown by the dotted line arrow B) of the arm cylinder 7B and/or the bucket cylinder 7C, but in this case, even if the on-off valves 9B and 9C are provided between the oil passages 84 and 85 as in the aforementioned first embodiment, the arm cylinder 7B and/or the bucket cylinder 7C does not contract since there is no place where the oil in the bottom side pressure receiving chamber 7L flows into, and consequently the arm 5B and/or the bucket 5C can be held in a fixed position on the back side of the plumb line Z. In other words, when the arm 5B and/or the bucket 5C is located on the back side of the plumb line Z, the so-called "natural lowering of the arm 5B and the bucket 5C" never occurs.

Giving a supplementary explanation, in the boom cylinder 7A in the second embodiment and all of the hydraulic cylinders 7 (7A, 7B, and 7C) of the loading shovel in the first embodiment, the working machine empty weight W acts only in the contracting direction of each of these hydraulic cylinders 7. Moreover, in this case, even if they intend to contract, they do not contract since there is no place where the oil in the bottom side pressure receiving chambers 7L flows into required for the contraction. Accordingly, the on-off valve 9A in the second embodiment and all of the on-off valves 9 (9A, 9B, and 9C) in the aforementioned first embodiment are provided between both the oil passages 84 and 85.

Needless to say, it is possible to provide the on-off valves 9 of the boom cylinder 7A in the second embodiment and all the hydraulic cylinders 7 of the loading shovel in the same manner as the on-off valves 9 of the arm cylinder 7B and the bucket cylinder 7C in the second embodiment. If the on-off valves 9 (9A—9A, 9B—9B, 9C—9C) are provided in such a manner, control flexibility for the on-off valves 9 increases, and hence various operation modes can be performed with a high degree of accuracy.

The operation and effects of the aforementioned second embodiment will be explained. In the loading shovel equipped with the first embodiment, a charge of electricity to the storage battery 33 by the reverse driving of the first and second hydraulic pumps P1 and P2 based on the working machine empty weight W occurs only at the time of "lowering" of all the hydraulic cylinders 7 as described above. In the backhoe shovel in the aforementioned second embodiment, however, the reverse driving of the first and second hydraulic pumps P1 and P2 based on the working machine empty weight W occurs only at the time of "lowering" in the case of the boom 5C to bring about the regeneration of energy by charging the storage battery 33 similarly to the explanation in (d) in the first embodiment, whereas in the case of the arm 5B and the bucket 5C, energy is regenerated by charging the storage battery 33 not only at the time of "lowering" but also at the time of "raising". The details thereof are as follows.

Incidentally, the respective actions of the base carrier 1, the superstructure 2, and the working machine 5 based on the respective forward and backward tiltings F and B of the operating levers 21 of the backhoe shovel are the same as those of the loading shovel, but the left and right tiltings L and R of the left and right working machine operating levers 21WL and 21WR are different from those of the loading shovel as follows. Namely, the left working machine operating lever 21WL performs arm excavation (arm lowering by the extension of the arm cylinder 7B) by the right tilting R, arm dump (arm raising by the contraction of the arm cylinder 7B) by the left tilting L, and on the other side, the right working machine operating lever 21WR performs bucket dump (upward rotation of the bucket by the contraction of the bucket cylinder 7C) by the right tilting R and bucket excavation (downward rotation of the bucket by the extension of the bucket cylinder 7C) by the left tilting L.

More specifically, if the operator gives the right tilting R to the left working machine operating lever 21WL when the arm 5B is located on the front side of the plumb line Z, the extension of the arm cylinder 7B (that is, "lowering" of the arm 5B) occurs by the working machine empty weight W and the first and second hydraulic pumps P1 and P2 of the arm cylinder driving hydraulic circuit are reversely driven to reversely drive the electric motor MB, whereby the electric motor MB generates electricity and its electromotive force is charged into the storage battery 33.

On the other hand, if the operator gives the left tilting L to the left working machine operating lever 21WL when the arm 5B is located on the back side of the plumb line Z, the contraction of the arm cylinder 7B (that is, "raising" of the arm 5B) occurs by the working machine empty weight W and the first and second hydraulic pumps P1 and P2 of the arm cylinder driving hydraulic circuit are reversely driven to reversely drive the electric motor MB, whereby the electric motor MB generates electricity and its electromotive force is charged into the storage battery 33.

Similarly, if the operator gives the left tilting L to the right working machine operating lever 21WR when the bucket 5C is located on the front side of the plumb line Z, the extension of the bucket cylinder 7C (that is, "downward rotation" of the bucket 5C) occurs by the working machine empty weight W, and the first and second hydraulic pumps P1 and P2 of the bucket cylinder driving hydraulic circuit are reversely driven to reversely drive the electric motor MC, whereby the electric motor MC generates electricity and its electromotive force is charged into the storage battery 33.

On the other hand, if the operator gives the right tilting L to the right working machine operating lever 21WR when the bucket 5C is located on the back side of the plumb line Z, the contraction of the bucket cylinder 7C (that is, "upward rotation" of the bucket 5C) occurs by the working machine empty weight W, and the first and second hydraulic pumps P1 and P2 of the bucket cylinder driving hydraulic circuit are reversely driven to reversely drive the electric motor MC, whereby the electric motor MC generates electricity and its electromotive force is charged into the storage battery 33.

Incidentally, if a load such as a rock or the like corresponding to the force with magnitude exceeding the working machine empty weight W, for example, is exerted on the bucket 5C in the aforementioned lowering based on the working machine empty weight W of the boom 5A and raising and lowering based on the working machine empty weights W of the arm 5B and the bucket 5C, likewise with (c) explained in the aforementioned first embodiment, "the lowering of the boom, the raising and lowering of the arm and bucket performed by electrically driving the electric motors MA, MB, and MC" are carried out, and the electric motors MA, MB, and MC are automatically switched to the excavating operation with either of the storage battery 33 or the generator G as a power source.

Other embodiments will be listed by way of illustration below.

(1) In the aforementioned embodiments, the control of the operating speed by the working machine empty weight W of each of the hydraulic cylinders 7 is performed by changing the maximum operating pressure of the accumulator 10, but instead of this, similar speed control can be performed, for example, in the following manner.

(1-1) During the operation of each of the hydraulic cylinders 7 by the working machine empty weight W, it is possible that the inverter 32 allows terminals of the stator coil of the electric motor M to automatically connect with each other via a variable resistor by a command current from the controller 20 and reduces the resistance of the variable resistor with an increase in command current, thereby performing control for a reduction in the reverse rotation speed of the electric motor M to control the operating speed.

(1-2) It is possible that brakes are provided in output rotating shafts of the electric motors M or input rotation shafts of the first and second hydraulic pumps P1 and P2, and that the operator controls the brakes. However, since braking with the brakes causes heat generation loss, and hence in terms of this heat loss, a small reduction in efficiency with respect to energy regeneration is inevitable.

(2) Although the first and second hydraulic pumps P1 and P2 are of a fixed displacement type in the aforementioned embodiments, they may be variable displacement pumps. In this case, the inverters 32 have only to normally and reversely rotate the electric motors M. In this case, the controller 20 comes to control the displacements of the first and second hydraulic pumps P1 and P2.

Moreover, it is desirable that the aforementioned both variable displacement hydraulic pumps P1 and P2 be of a normal/reverse inversion type to enable the inversion between a discharge port and a suction port. In this case, the inverters 32 have only to either normally rotate or reversely rotate the electric motors M, and the controller 20 performs the inversion between the discharge port and suction port of each of the variable displacement hydraulic pumps P1 and P2 and a change in pump displacement.

Figure 5:
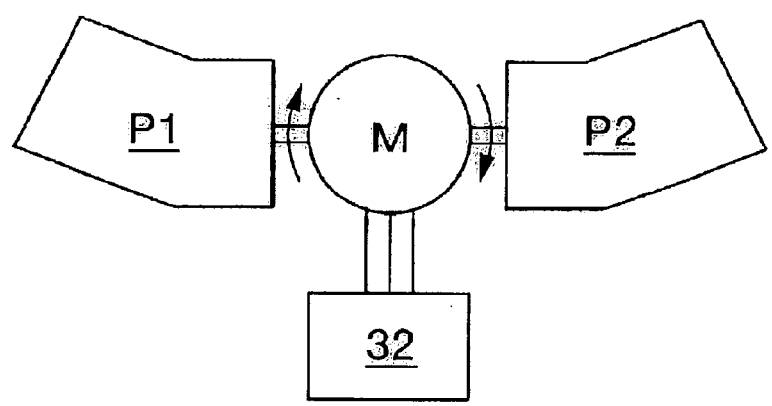
FIG. 5 is a view of an inclined shaft type piston pump provided in a double end output shaft type electric motor.

Furthermore, as shown in FIG. 5, it is desirable that inclined shaft type piston pumps be used as the first and second hydraulic pumps P1 and P2, that the electric motors M be of a double end output shaft type, and that the first pump P1 be connected to one of the double end output shaft and the second hydraulic pump P2 be connected to the other thereof.

There are various types of hydraulic pumps such as a gear type, a vane type, a piston type, and the like, but a piston type is desirable from the viewpoint of an increase in discharge pressure. Moreover, in the case of the piston type, an inclined shaft type is more desirable than a swash plate type from the viewpoint of high speed rotation resistance and robustness. Namely, if such an inclined shaft type is used, a small pump can be direct-coupled to an electric motor without a speed reducer therebetween even if the flow demand is large. Incidentally, since two of the first and second hydraulic pumps P1 and P2 are used in the aforementioned embodiments, different from pumps of the swash plate type and other types, in the inclined shaft type pump, two inclined shaft type pumps cannot be connected in series to each of the electric motor M, and hence both the inclined shaft type pumps are each connected to the double end output shaft of the electric motor M. In doing so, an electric motor/pump assembly body which has attained compactification by eliminating a speed reducer can be provided. Of course, it can be arranged suitably in a machine without an allowance which is incapable of series connection.

(3) Although the hydraulic cylinders 7 in the aforementioned embodiments are each a single rod type double acting cylinder, they need not be limited to this example, and they may be each "a hydraulic cylinder which is fixedly provided in a piston rod protruding outward and slidably housing a piston whose both ends have different pressure receiving areas". More specifically, a publicly known double rod type double acting cylinder (on condition that the outer diameters of both rods are different from each other) and a double acting telescopic hydraulic cylinder are also usable, and according to these cylinders, without the need for a detailed explanation, the same operation and effects as the single rod type double acting cylinder are produced.

(4) Although both the first and second hydraulic pumps P1 and P2 are direct-coupled to the output shaft (including the double end output shaft) of each of the electric motors M (or direct-coupled thereto via the speed reducer (not shown)), the first and second hydraulic pumps P1 and P2 may be arranged independently and driven individually. However, in order to obtain the same operation and effects as the aforementioned embodiments in this case, it is necessary to "perform driving so that the second hydraulic pump P2 sucks oil in the accumulator 10 and discharges it to the bottom side pressure receiving chamber 7L when the first hydraulic pump P1 sucks oil in the head side pressure receiving chamber 7S and discharges it to the bottom side pressure receiving chamber 7L, and conversely the second hydraulic pump P2 sucks oil in the bottom side pressure receiving chamber 7L and discharge it to the oil sump 10 when the first hydraulic pump P1 sucks the oil in the bottom side pressure receiving chamber 7L and discharges it to the head side pressure receiving chamber 7S".

(5) The accumulator 10 is used in the aforementioned embodiments, but a simple "oil sump" also may be used. In this case, in the case of the aforementioned embodiments, energy which cannot be recovered by the accumulation of pressure is recovered by the storage battery 33.

Figure 6:
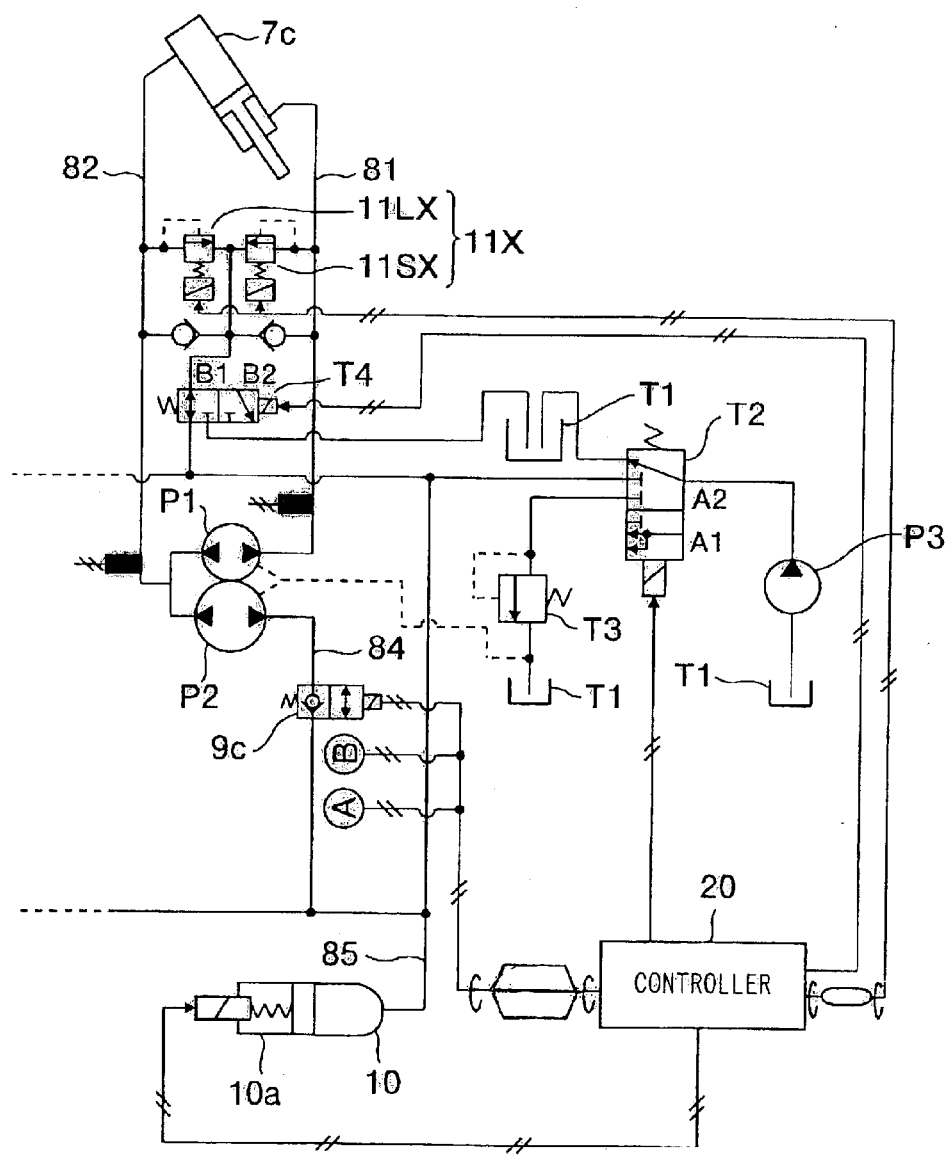
FIG. 6 is a hydraulic drive circuit diagram in which a first and third switching valves, a variable relief valve, and an oil sump are additionally provided.

(6) FIG. 6 is a partial view of the driving hydraulic circuit of the bucket cylinder 7C in FIG. 2, and as shown on illustration, when at least one of the first and second hydraulic pumps P1 and P2 is a piston pump, it is recommended to provide oil sumps T1 which catch external leakage of oil from the piston pump, a third hydraulic pump P3 which sucks the oil in the oil sumps T1, and a first switching valve T2 which selectably leads discharged oil from the third hydraulic pump P3 to either one of the accumulator 10 or the oil sumps T1 (switches between a position A1 and a position A2).

For example, in the gear type and vane type pumps, internal leakage of oil occurs, but in the piston pump, external leakage occurs. Accordingly, it is necessary to return oil which has leaked to the outside to the passages 81 and 82 or the accumulator 10. The leakage oil may be drained to either lower pressure side out of the passages 81 and 82, but in the aforementioned embodiments, the lower pressure side also becomes pressure of the accumulator 10. Therefore, this pressure becomes back pressure of a piston of the piston pump, which lowers torque efficiency of the pump. Moreover, even if a first hydraulic pump system is a closed circuit and a second hydraulic pump system is an open circuit, the second hydraulic pump system is also a closed circuit when the second hydraulic pump system is seen including the accumulator 10. Incidentally, the capacity of the accumulator 10 is basically required to be larger than a difference in volume between the head side pressure receiving chamber 7S and the bottom side pressure receiving chamber 7L, but in actuality, considering that heat generated in the pump, the actuator, and so on during driving is cooled, the accumulator 10 needs to be considerably large. Thus, the oil sumps T1 and the third hydraulic pump P3 are provided, so that the equivalent of leakage oil can be retuned to the passages 81 and 82 or the accumulator 10. It should be noted that the first switching valve T2 is provided such that the pressure in the accumulator 10 does not escape to the oil sumps T1 unconditionally by the addition of the oil sumps T1 and conversely oil is not supplied into the accumulator 10 without limitation by the addition of the third hydraulic pump P3. Namely, the third hydraulic pump P3 is connected to the engine G and freely driven. At this time, the first switching valve T2 is in the position A2. On the other hand, when the passages 81 and 82 or the accumulator 10 is replenished with oil (in this embodiment, the accumulator 10 is replenished with oil), the first switching valve T2 is switched to the position A1. Then, discharged oil from the third hydraulic pump P3 is introduced into the accumulator 10. Incidentally, switching of the first switching valve T2 may be operated manually by the operator timely, but in this embodiment, based on the operation program which is previously stored by the controller 20, a current for switching the first switching valve T2 to the position A1 is fed to a solenoid of the first switching valve T2 periodically, for example, for three seconds. It should be noted that although the symbol and numeral T3 is a relief valve for discharge pressure of the third hydraulic pump P3, this can be eliminated when replenish quantity control is regular.

Incidentally, if the operation program of the controller 20 indicates that driving of the third hydraulic pump P3 is stopped at the timing of introduction of oil into the oil sumps T1 of the first switching valve T2, the first switching valve T2 and the relief valve T3 may be eliminated. Which one is adopted is can be determined from specification of the whole machine.

(7) Moreover, in FIG. 6, the safety valves 11S and 11L are of a solenoid variable type (variable relief valves). Furthermore, a second switching valve T4 for selectively draining drain oil to either one of the accumulator 10 or the oil sumps T1 (a position B1 or a position B2) is provided on the drain side of a variable relief valve 11X.

Incidentally, if both the safety valves 11S and 11L are arranged on the accumulator 10 side of the check valves 12S and 12L, both the safety valves 11S and 11L can be constructed by one safety valve 11 in the aforementioned embodiments, this embodiment, and other embodiments. Accordingly, hereinafter the variable safety valves 11S and 11L are defined as the variable relief valve 11X.

For example, if the outside air temperature becomes −20° C. at the start of operation of a machine when it is cold and in a severe cold district, oil in a circuit becomes highly viscous even if it has a high viscosity index (for example, SAE10W-CD), and the operator is compelled to perform a warming-up operation for a long time which needs constant attention. However, if the set relief pressure of the variable relief valve 11X is reduced, and the second switching valve T4 is switched to the position B2 to relieve oil to the accumulator 10, the temperature of the operating oil automatically increases by relief loss (which is heat generation) without putting a high load on the hydraulic cylinders and the first and second hydraulic pumps. Hence, by selecting the set relief pressure, the warming-up time can be shortened, and the aforementioned hard operation which needs constant attention is eliminated.

Moreover, in the hydraulic circuit, cavitation and aeration sometimes occur as stated above. Bubbles once produced cause disadvantages such as pitting. However, if the set relief pressure of the variable relief valve 11X is reduced and the second switching valve T4 is switched to the position B1 to relieve the oil to the oil sumps T1, the pressure of the circuit does not increase, whereby if the first and second hydraulic pump P1 and P2 are external gear pumps, a difference between an increase and a decrease in trapped pressure in a mesh portion of gears can be reduced, and hence pitting and the like in a gear surface can be prevented. Incidentally, even if drain oil containing bubbles is drained to the accumulator 10, the bubbles are not released to the atmosphere, and therefore the bubbles do not easily disappear (or do not disappear). On the other hand, if the drain oil containing bubbles are drained to the oil sumps T1, the bubbles are released to the atmosphere from the oil sumps T1, and thus they disappear from within the oil.

Incidentally, the easiest switching control of the second switching valve T4 is timely manual operation by the operator, but in this embodiment, when the controller 20 inputs an oil temperature which is provided specially based on the previously stored operation program and the oil temperature is equal to or lower than a predetermined temperature, or periodically, for a predetermined period of time, a current for switching the second switching valve T4 between the positions B1 and B2 is fed to a solenoid of the second switching valve T4.

Figure 7:
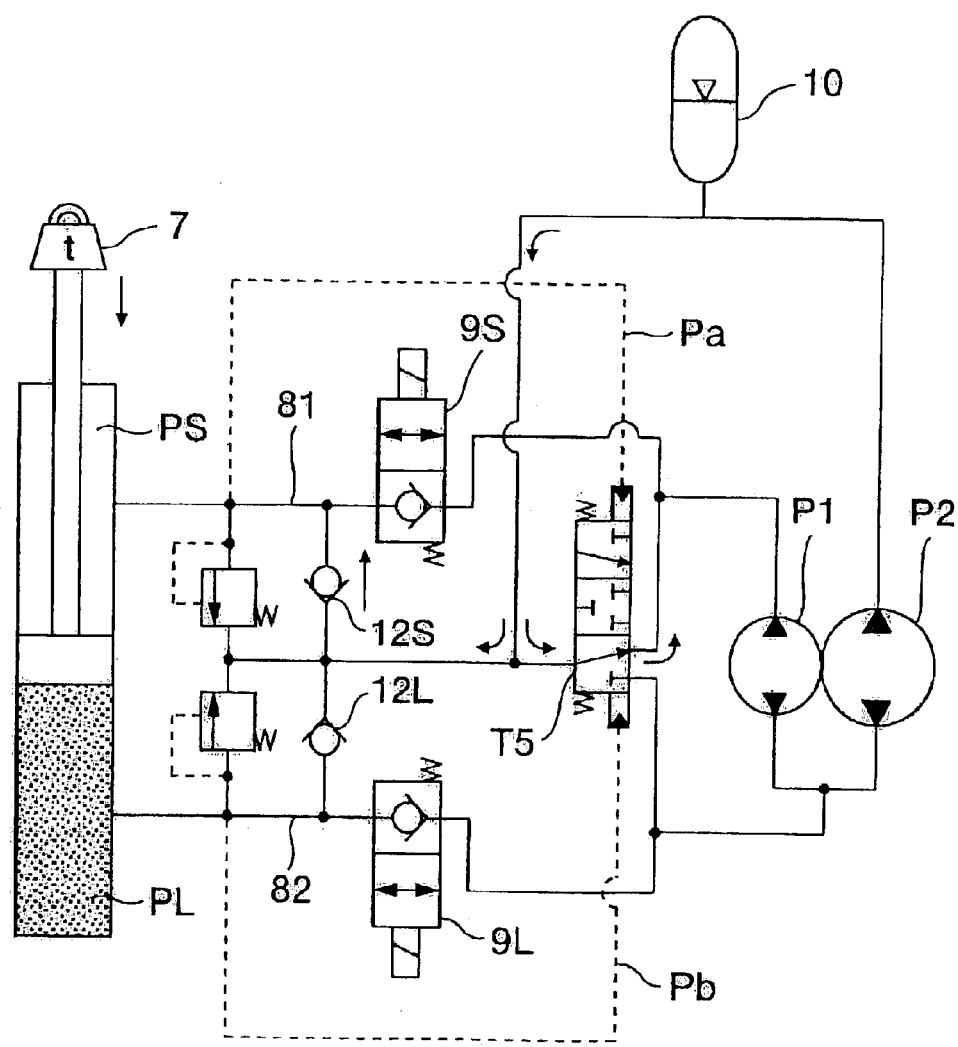
FIG. 7 is a diagram in which the third switching valve is in a lower position.
Figure 8:
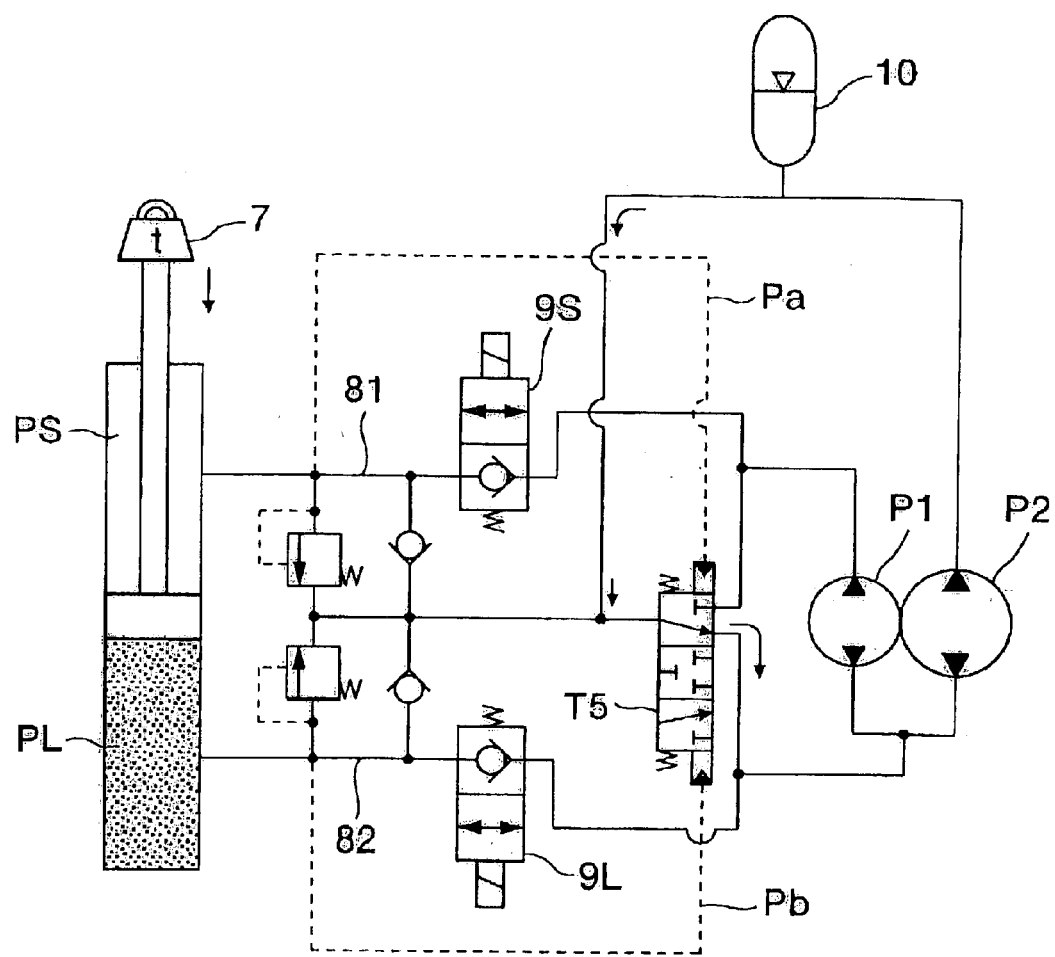
FIG. 8 is a diagram in which the third switching valve is in an upper position.
Figure 9:
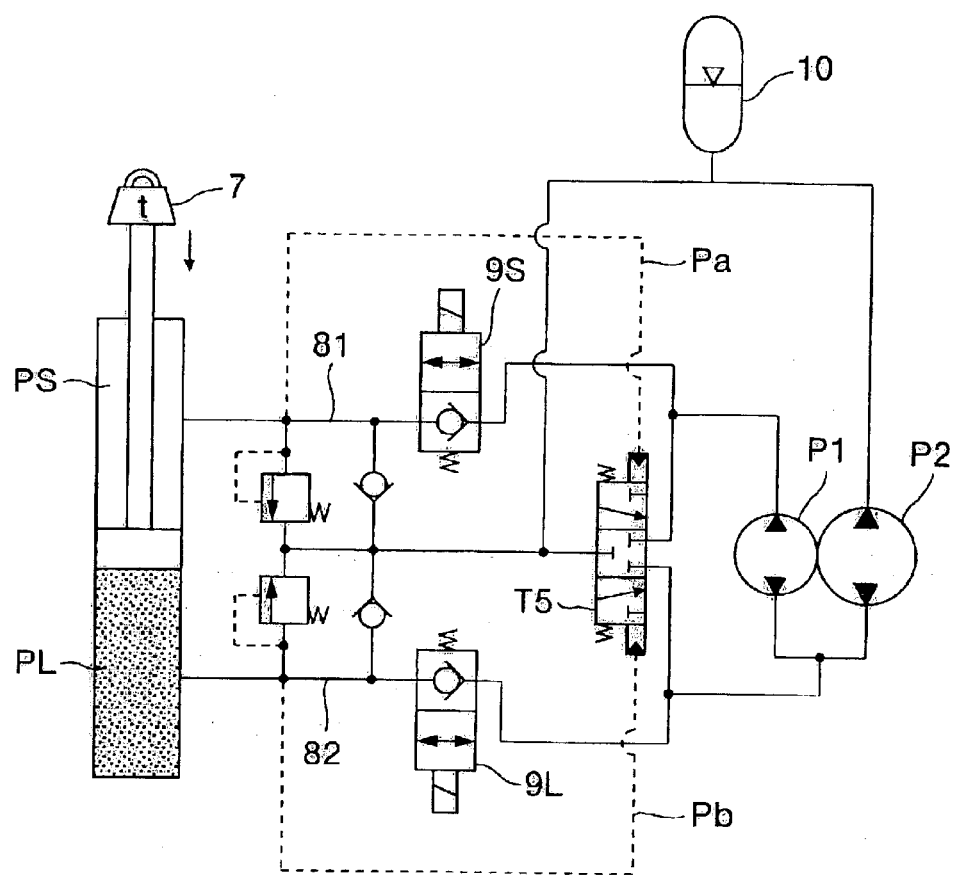
FIG. 9 is a diagram in which the third switching valve is in a center position.

(8) As shown in FIG. 7 to FIG. 9 and FIG. 10 to FIG. 12, it is possible to provide a third switching valve T5 which includes a first port opening into a passage leading to the accumulator 10, a second port opening into a passage leading to a point between the first hydraulic pump P1 and a first on-off valve 9S (which corresponds to 9B or 9C in FIG. 4) of the passage 81, a third port opening into a passage leading to a point between the first and second hydraulic pumps P1 and P2 and a second on-off valve 9L (which corresponds to 9B or 9C in FIG. 4) of the second passage 82, receives oil pressure Pa of the passage 81 as pilot pressure at a pressure receiving portion on one end side, on the other hand receives pressure Pb of the passage 82 as pilot pressure at a pressure receiving portion on the other end side, and includes a first position (the lower position in the drawing) which allows only the first and second ports to communicate with each other in the inside when "Pa<Pb" shown in FIG. 7, a second position (the upper position in the drawing) which allows only the first and third ports to communicate with each other in the inside when "Pb<Pa" shown in FIG. 8, and a third position (the center position in the drawing) which allows all of the first to third ports to be interrupted from one another in the inside when "Pa=Pb" shown in FIG. 9.

Figure 10:
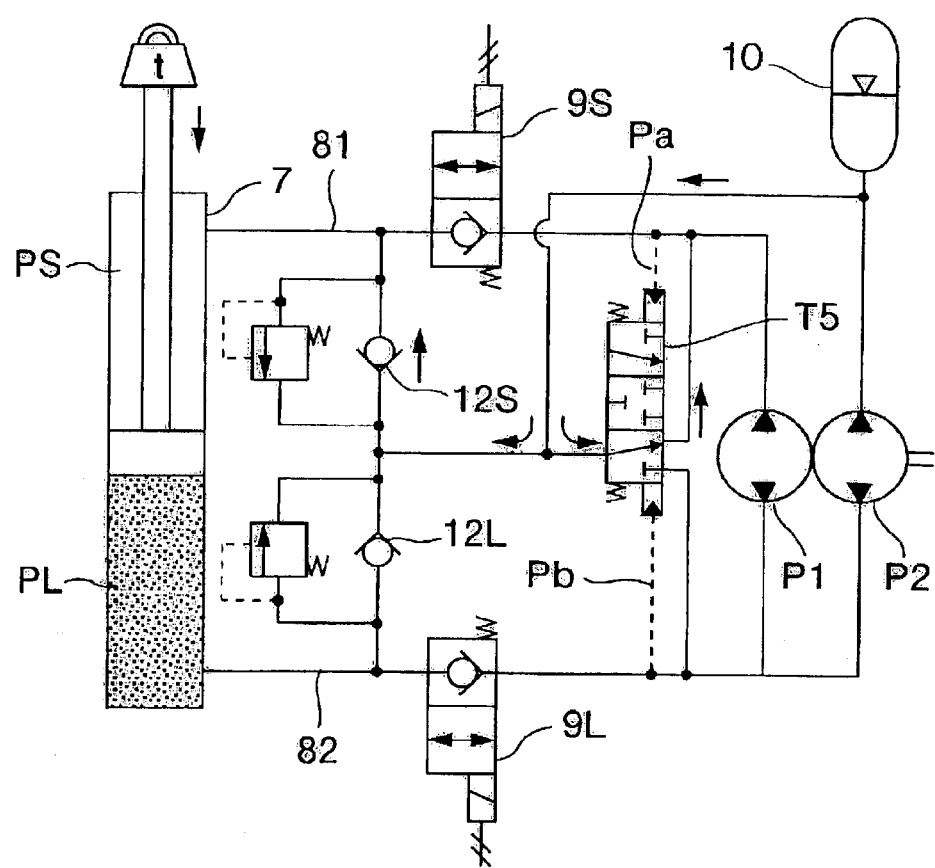
FIG. 10 is a diagram in which a different third switching valve is in a lower position.
Figure 11:
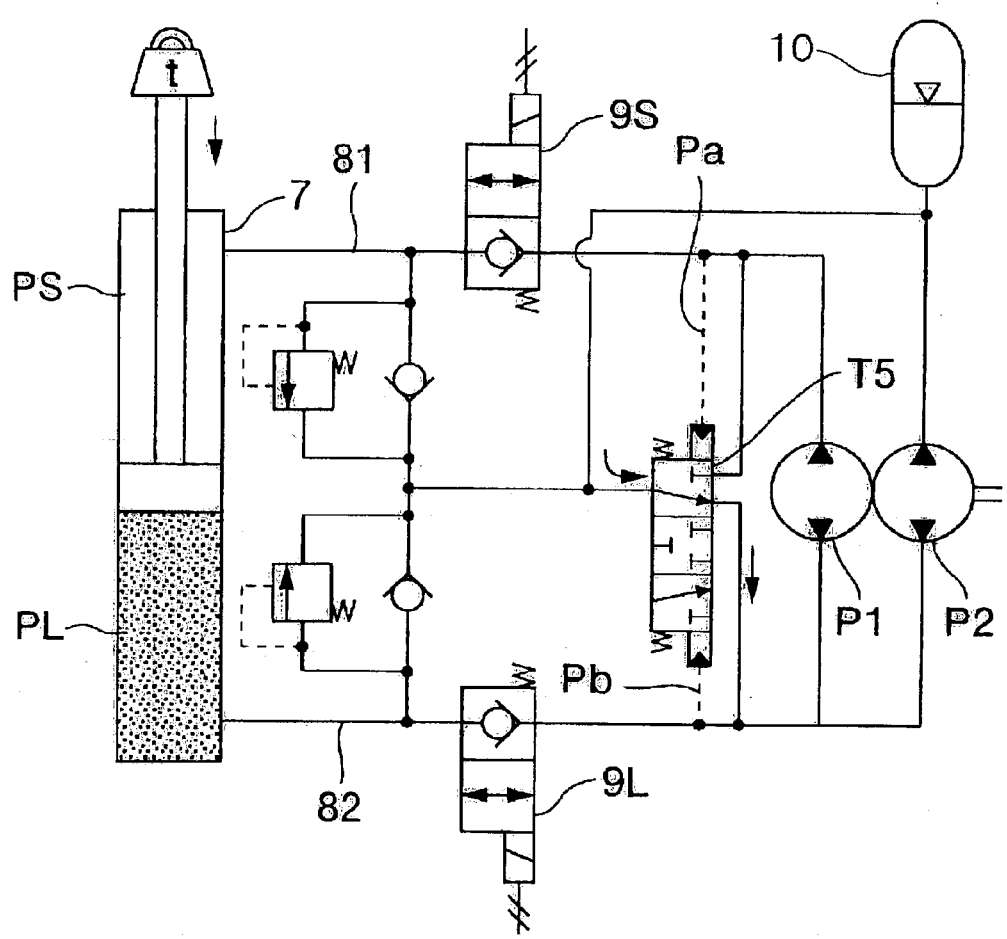
FIG. 11 is a diagram in which the different third switching valve is in an upper position.
Figure 12:
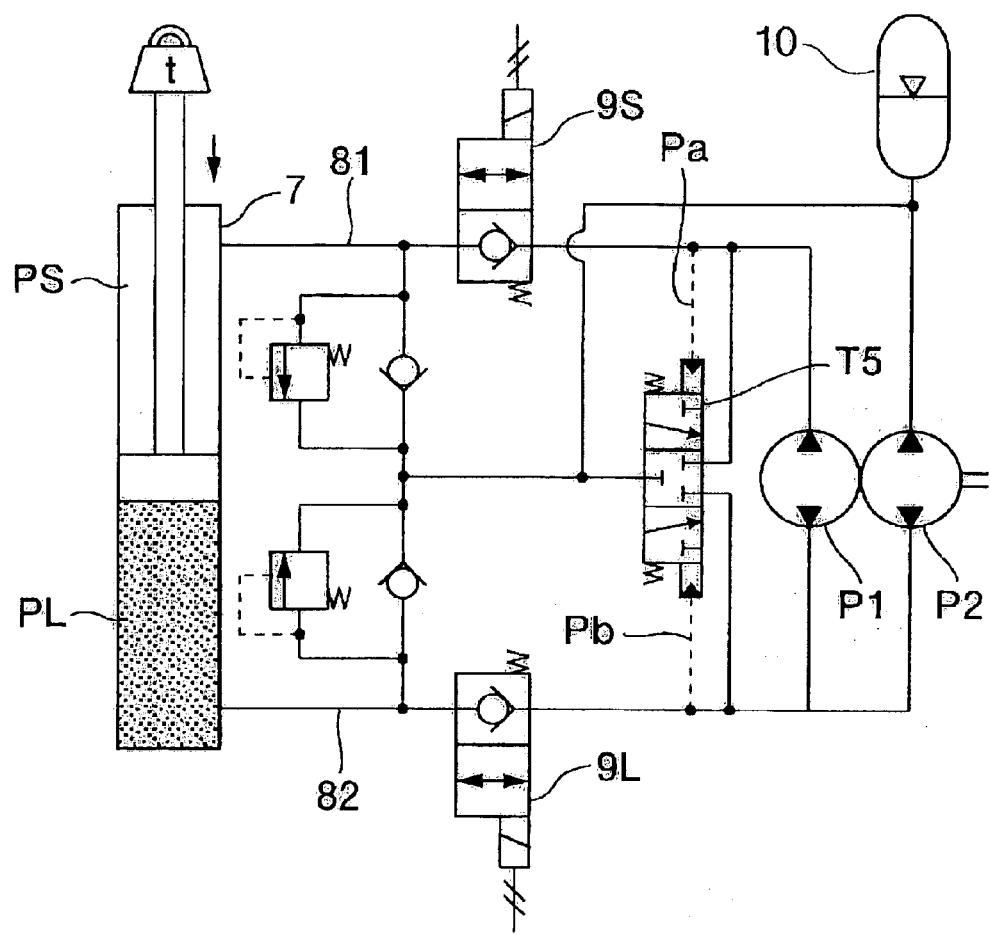
FIG. 12 is a diagram in which the different third switching valve is in a center position.

Incidentally, the only one point of difference between FIG. 7 to FIG. 9 and FIG. 10 to FIG. 12 is in that outlet ports of the pilot pressures Pa and Pb are on the cylinder sides of the first and second on-off valves 9S and 9L in FIG. 7 to FIG. 9, whereas they are on the first and second hydraulic pumps P1 and P2 sides of the first and second on-off valves 9S and 9L in FIG. 10 to FIG. 12, and in either case, the following function, and operation and effects can be fulfilled.

More specifically, as shown in FIG. 7 to FIG. 12, in the passage on the first hydraulic pump P1 side of the first on-off valve 9S and the passage on the first and second hydraulic pumps P1 and P2 side of the second on-off valve 9L, a check valve such as the first or second check valve 12S or 12L is not provided. Even if such a check valve is not provided, oil pressure in the accumulator 10 is fed to the lower pressure side passage until the third switching valve T5 reaches the state of "Pa=Pb" shown in FIG. 9 and FIG. 11 even when the rotation of the first and second hydraulic pump P1 and P2 is stopped and the first and second on-off valves 9S and 9L are closed as shown in FIG. 7 and FIG. 8, and FIG. 10 and FIG. 11. Consequently, cavitation and aeration become difficult to bring about when the rotation of the first and second hydraulic pumps P1 and P2 is started.

Incidentally, as shown in FIG. 7 to FIG. 12, the first and second on-off valves 9S and 9L each house therein a check valve which permits oil flow only to the cylinder 7. Therefore, in this embodiment, when they are closed, oil pressures of the passages 81 and 82 are converged in pressure accumulated in the accumulator 10 by the cooperative operation of the check valves in the first and second on-off valves 9S and 9L, the first and second check valves 12S and 12L, and the third switching valve T5.

(9) According to configurations of both embodiments in FIG. 7 to FIG. 9 and FIG. 10 to FIG. 12, the following suitable control can be performed. An example of the suitable control will be explained using the configuration of the embodiment in FIG. 10 to FIG. 12 and referring to FIG. 17 to FIG. 29. It should be noted that in advance of the explanation, the function of the third switching valve T5 in the configuration of the embodiment will be explained in advance with reference to FIG. 13 to FIG. 16.

Figure 13:
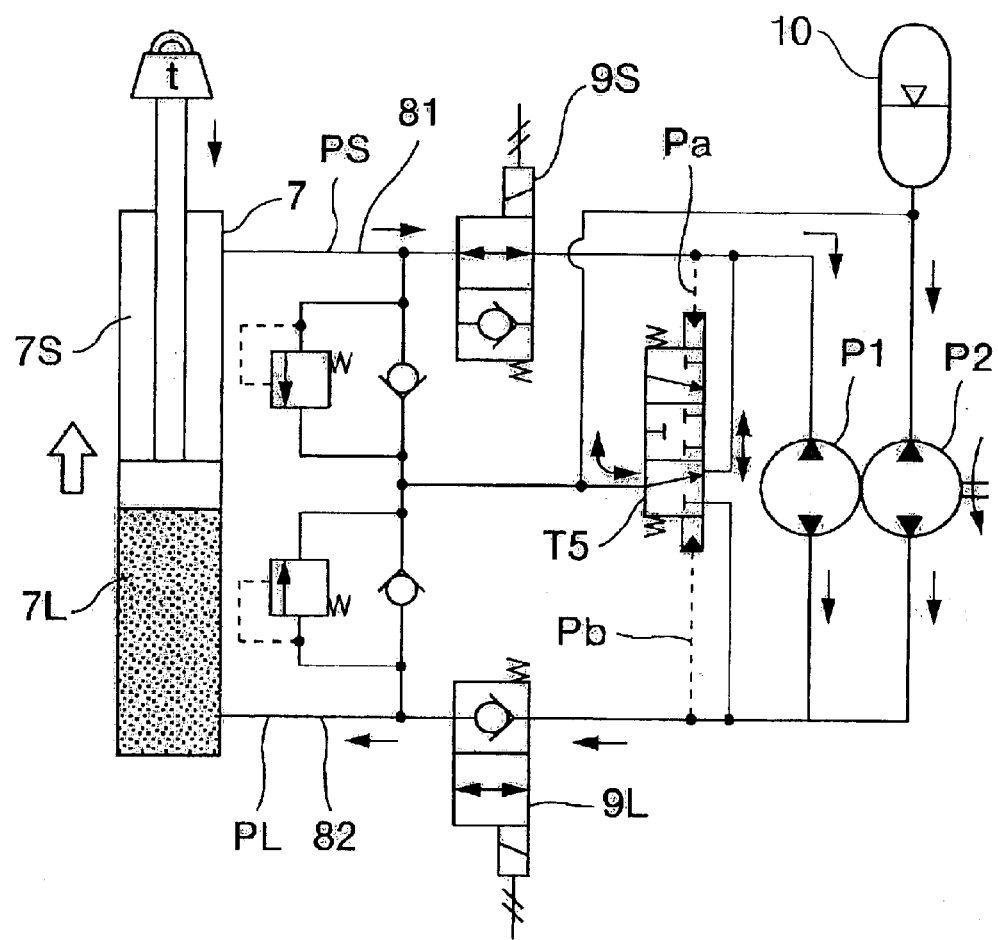
FIG. 13 is a diagram in which a cylinder is extended against an external load.
Figure 14:
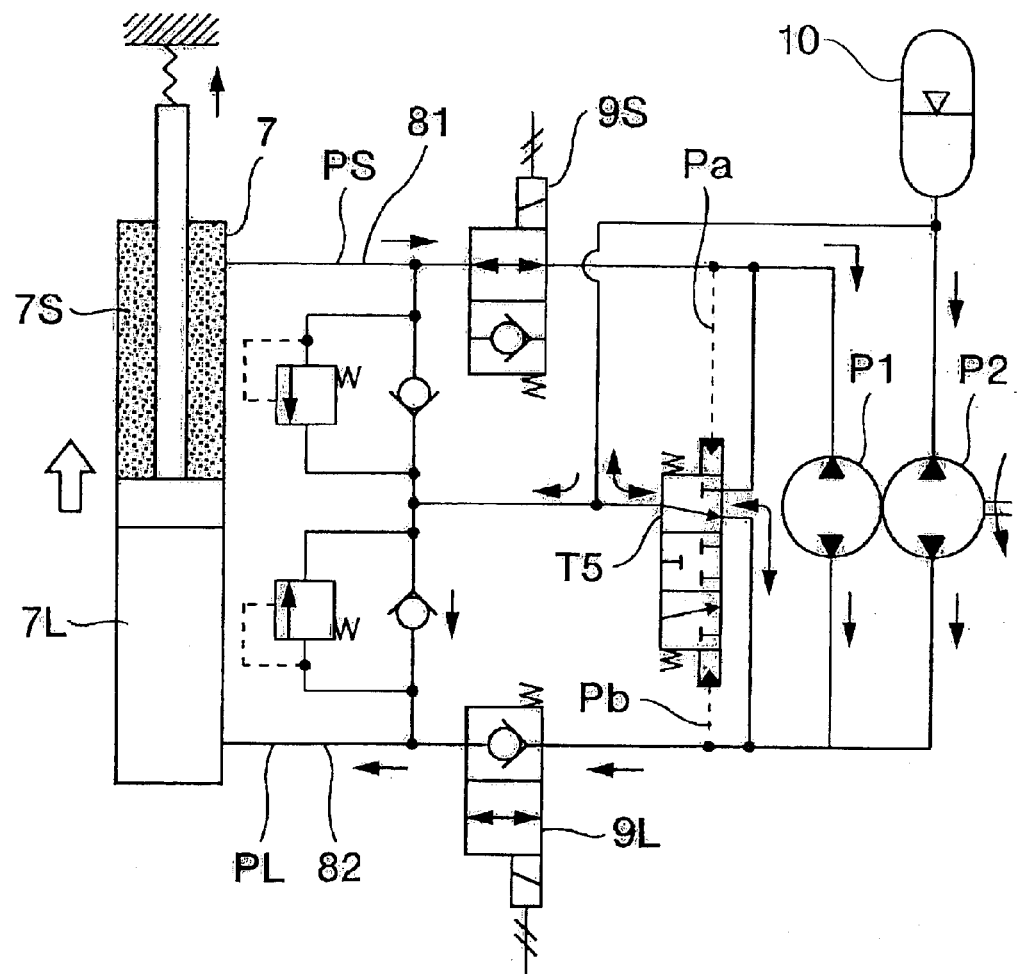
FIG. 14 is a diagram in which the cylinder is extended by the external load.
Figure 15:
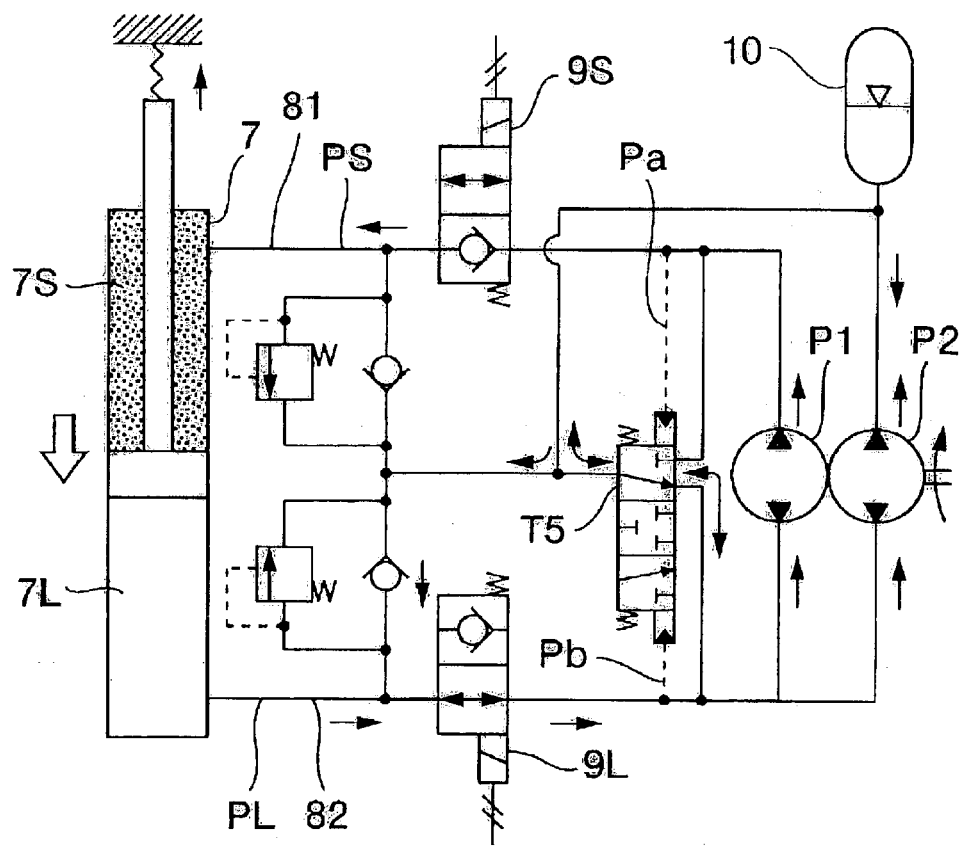
FIG. 15 is a diagram in which the cylinder is contracted against the external load.
Figure 16:
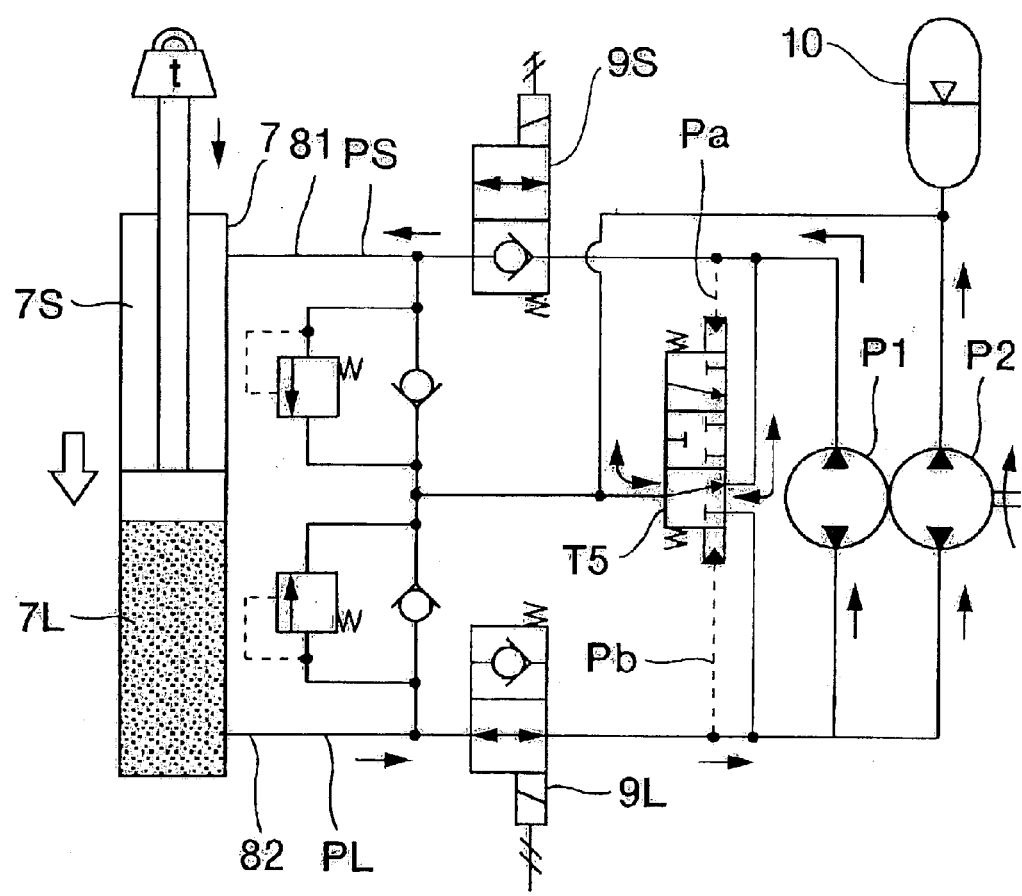
FIG. 16 is a diagram in which the cylinder is contracted by the external load.

FIG. 13 shows a case where the cylinder 7 is extended against an external load t, FIG. 14 shows a case where the cylinder 7 is extended by the external load t, FIG. 15 shows a case where the cylinder 7 is contracted against the external load t, and FIG. 16 shows a case where the cylinder 7 is contracted by the external load t.

In the case of FIG. 13, the controller 20 opens the first on-off valve 9S and rotates the first and second hydraulic pumps P1 and P2 to supply pressure oil to the bottom side pressure receiving chamber 7L via the check valve in the second on-off valve 9L. In this case, "PS<PL" is obtained, and hence the third switching valve T5 is switched to the lower position to allow the head side pressure receiving chamber 7S and the accumulator 10 to communicate with each other, resulting in "PS=Pa=accumulated pressure". Accordingly, the cylinder 7 is extended with a just enough quantity of oil.

In the case of FIG. 14, the controller 20 opens the first on-off valve 9S and rotates the first and second hydraulic pumps P1 and P2 to supply pressure oil to the bottom side pressure receiving chamber 7L via the check valve in the second on-off valve 9, but in this case, "PS>PL" is obtained, and hence the third switching valve T5 is switched to the upper position to allow the bottom side pressure receiving chamber 7L and the accumulator 10 to communicate with each other, resulting in "PL=Pb=accumulated pressure". Accordingly, the cylinder 7 is extended with a just enough quantity of oil.

In the case of FIG. 15, the controller 20 opens the second on-off valve 9L and rotates the first and second hydraulic pumps P1 and P2 to supply pressure oil to the head side pressure receiving chamber 7S via the check valve in the first on-off valve 9S, and in this case, "PS>PL" is obtained, whereby the third switching valve T5 is switched to the upper position to allow the bottom side pressure receiving chamber 7L and the accumulator 10 to communicate with each other, resulting in "PL=Pb=accumulated pressure". Accordingly, the cylinder 7 is contracted with a just enough quantity of oil.

In the case of FIG. 16, the controller 20 opens the second on-off valve 9L and rotates the first and second hydraulic pumps P1 and P2 to supply pressure oil to the head side pressure receiving chamber 7S via the check valve in the first on-off valve 9S, and in this case, "PL>PS" is obtained, whereby the third switching valve T5 is switched to the lower position to allow the bottom side pressure receiving chamber 7L and the accumulator 10 to communicate with each other, resulting in "PL=Pa=accumulated pressure". Accordingly, the cylinder 7 is contracted with a just enough quantity of oil.

Namely, the third switching valve T5 allows the lower pressure side passage in which cavitation and aeration tend to occur to communicate with the accumulator 10 to maintain the lower pressure side passage at the accumulated pressure, and thereby has the function of preventing cavitation and aeration. It should be noted that this function goes for the third switching valve T5 in the configuration of the embodiment in FIG. 7 to FIG. 9.

The explanation is returned to the suitable control example. This control example is as shown in FIG. 17 to FIG. 20. FIG. 17 to FIG. 20 show the suitable control example of the controller 20 when the cylinder 7 is contracted by tilting the operating lever 21 forward (FIG. 18 to FIG. 20) from a neutral state (FIG. 17) with respect to the cylinder 7 which receives the external load t in the contracting direction. The details thereof are as follows.

Figure 17:
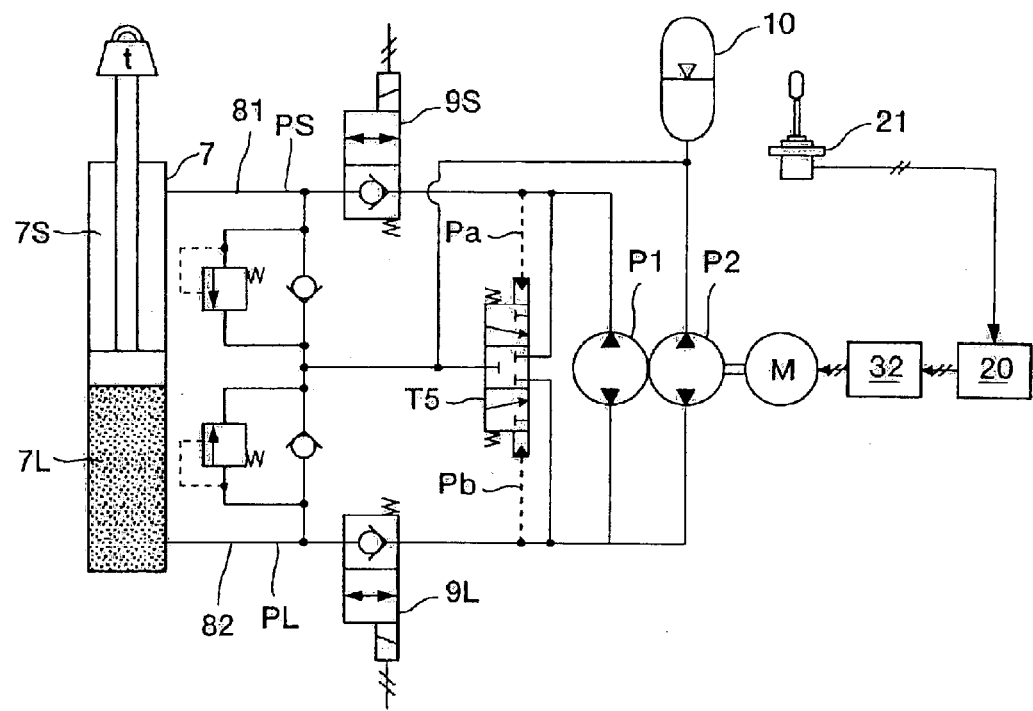
FIG. 17 is a diagram showing a neutral state of an operating lever.

FIG. 17 shows the neutral state of the operating lever 21. On this occasion, the first and second on-off valves 9S and 9L are closed by the controller 20. Incidentally, although it is stated that they are "closed", as described above, and as shown in FIG. 2 and FIG. 4, each closed position houses therein a check valve for permitting the oil flow only toward the cylinder, and hence they are always open for the oil flow toward the cylinder. "PL>PS" holds here, and the third switching valve T5 is brought to the aforementioned state (Pa=Pb) in FIG. 12 from the aforementioned state in FIG. 10 or FIG. 11, resulting in "PS=Pb=Pa=accumulated pressure".

Figure 18:
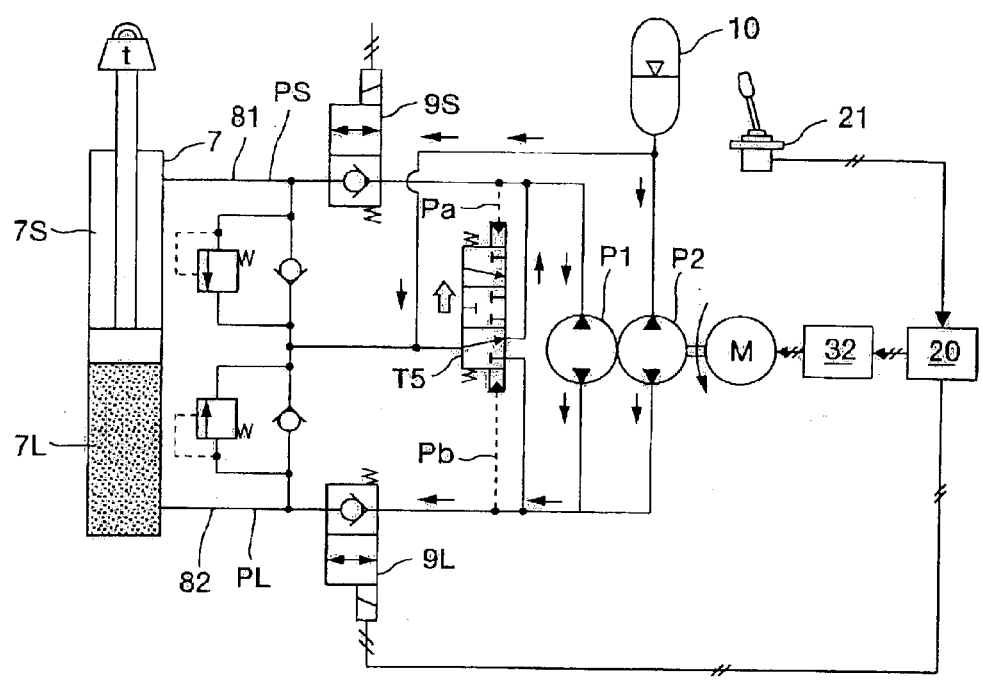
FIG. 18 is a diagram in which an electric motor is reversely rotated from the state in FIG. 17.
Figure 19:
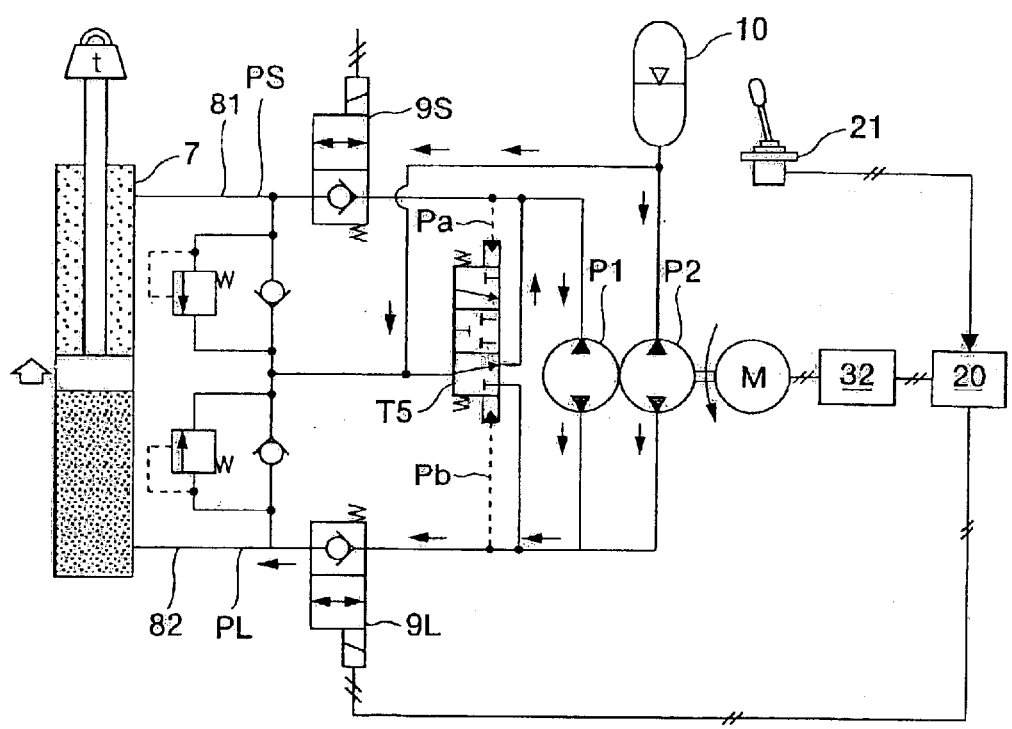
FIG. 19 is a diagram showing the same control state as that in FIG. 18.
Figure 20:
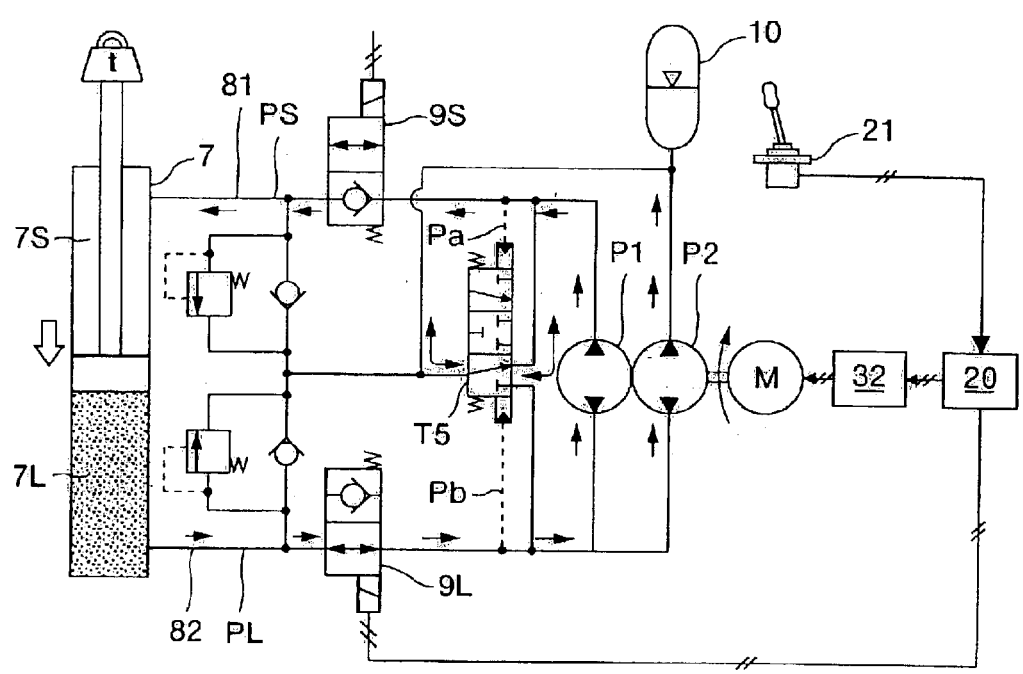
FIG. 20 is a diagram in which the electric motor is normally rotated from the state in FIG. 19.

Then, when the operating lever 21 is tilted forward, the controller 20, as shown in FIG. 18 and FIG. 19, rotates only the electric motor M in the extending direction of the cylinder 7 while the first and second on-off valves 9S and 9L are closed. As a result, when the pressure of the passage 82 overall becomes the oil pressure PS, or at the appropriate time judged by the controller 20, the controller 20, as shown in FIG. 20, opens the second on-off valve 9L and reversely rotates the electric motor M in the contracting direction of the cylinder 7. Thus, the cylinder 7 is contracted.

The reason of suitability of the aforementioned suitable control example will be explained referring to FIG. 21 to FIG. 24. In the aforementioned control example, with respect to the cylinder 7 which receives the external load t in the contracting direction, the operating lever 21 is tilted forward (FIG. 18 to FIG. 20) from its neutral state (FIG. 17), and when the cylinder 7 is contracted, despite the forward tilting of the operating lever 21, the controller 20 temporarily supplies pressure oil in the extending direction of the cylinder 7 for a period of time shown in FIG. 18 and FIG. 19.

Examples of ordinary control in which such temporary supply of oil in the extending direction of the cylinder 7 is eliminated are a first and a second example described below.

Figure 21:
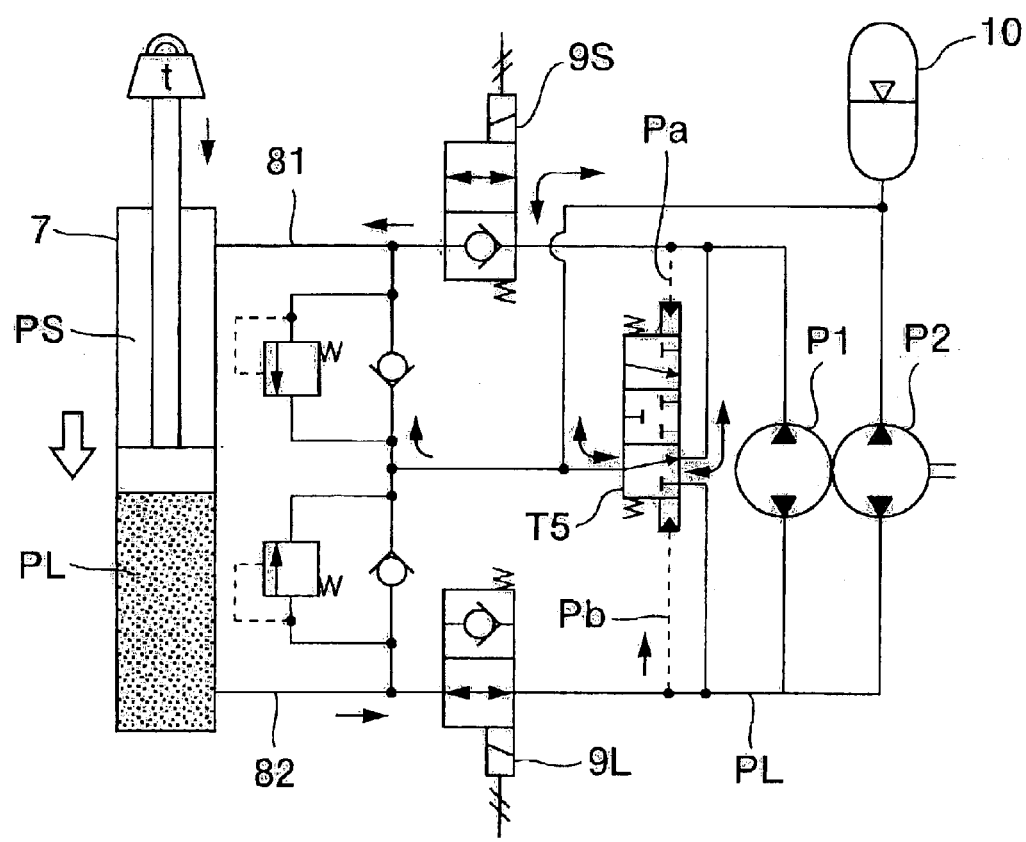
FIG. 21 is a diagram in which a second on-off valve is opened.
Figure 22:
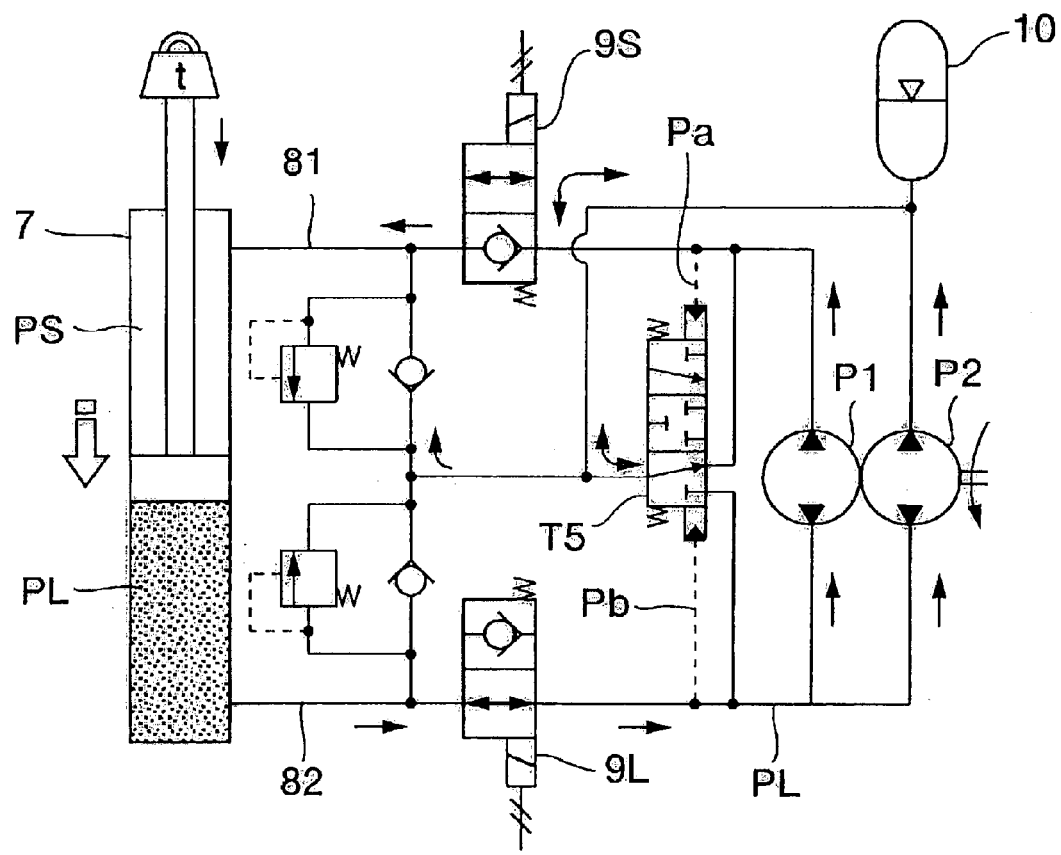
FIG. 22 is a diagram in which the electric motor is rotated after the second on-off valve is opened.

FIG. 21 and FIG. 22 show the first example, and a case where the second on-off valve 9L is first opened (FIG. 21), and then the electric motor M is rotated in the cylinder contracting direction (FIG. 22). On the other hand, FIG. 23 and FIG. 24 show the second example, and a case where the electric motor M is first rotated in the cylinder contracting direction (FIG. 23), and then the second on-off valve 9L is opened (FIG. 24).

In the first example, when the second on-off valve 9L is opened, oil pressure in the bottom side pressure receiving chamber 71 reversely drives the first and second hydraulic pumps P1 and P2, whereby the cylinder 7 continues contracting by itself (FIG. 21). Therefore, to bring this under control, it is necessary to rotate the electric motor M in the cylinder contracting direction in haste (FIG. 22). Namely, in the first example, the fact that the cylinder 7 continues contracting by itself shows perfectly satisfactory control from the viewpoint of energy recovery. However, there is a problem that even if the control of the contraction speed or contraction amount of the cylinder is tried by generating some reverse rotation force in the electric motor M at this time, the control of the contraction speed and the contraction length between the opening of the second on-off valve 9L and the generation of the reverse rotation force cannot be performed, and in addition there is a problem that two-stage contraction occurs. Contrary to this, in the aforementioned suitable control example, such problems do not arise.

Figure 23:
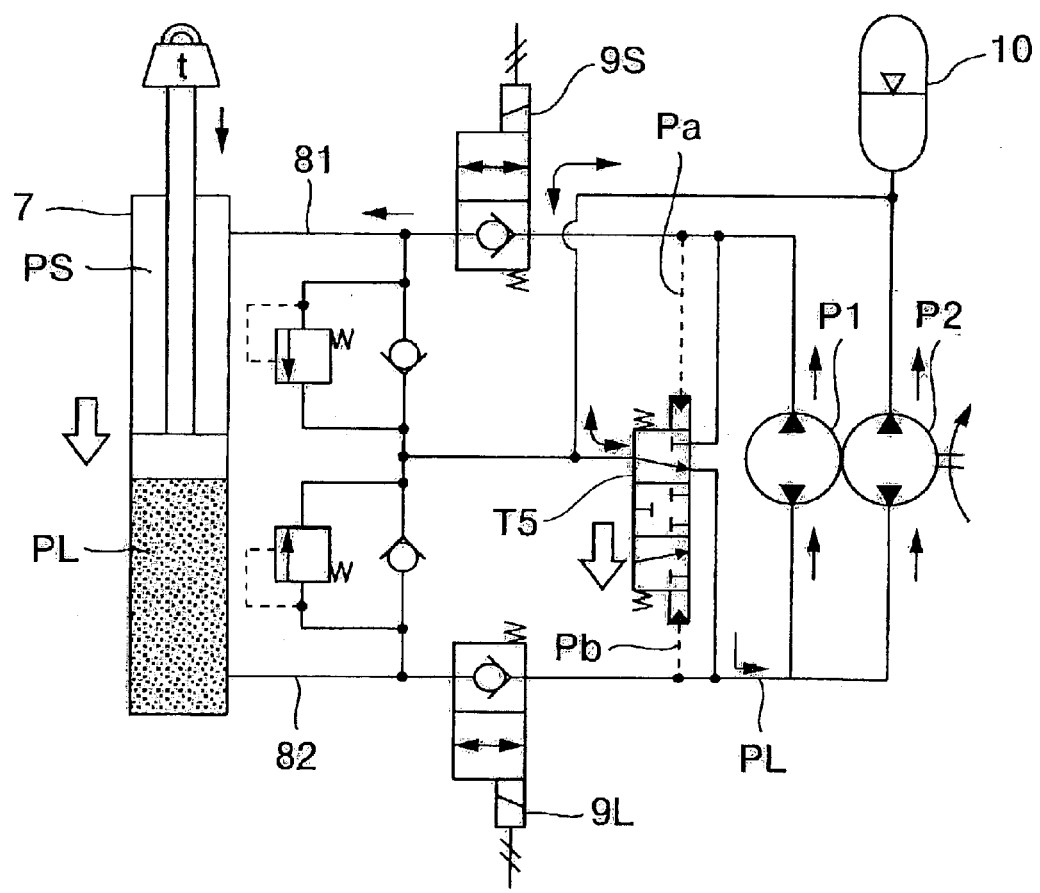
FIG. 23 is a diagram in which the electric motor is rotated.
Figure 24:
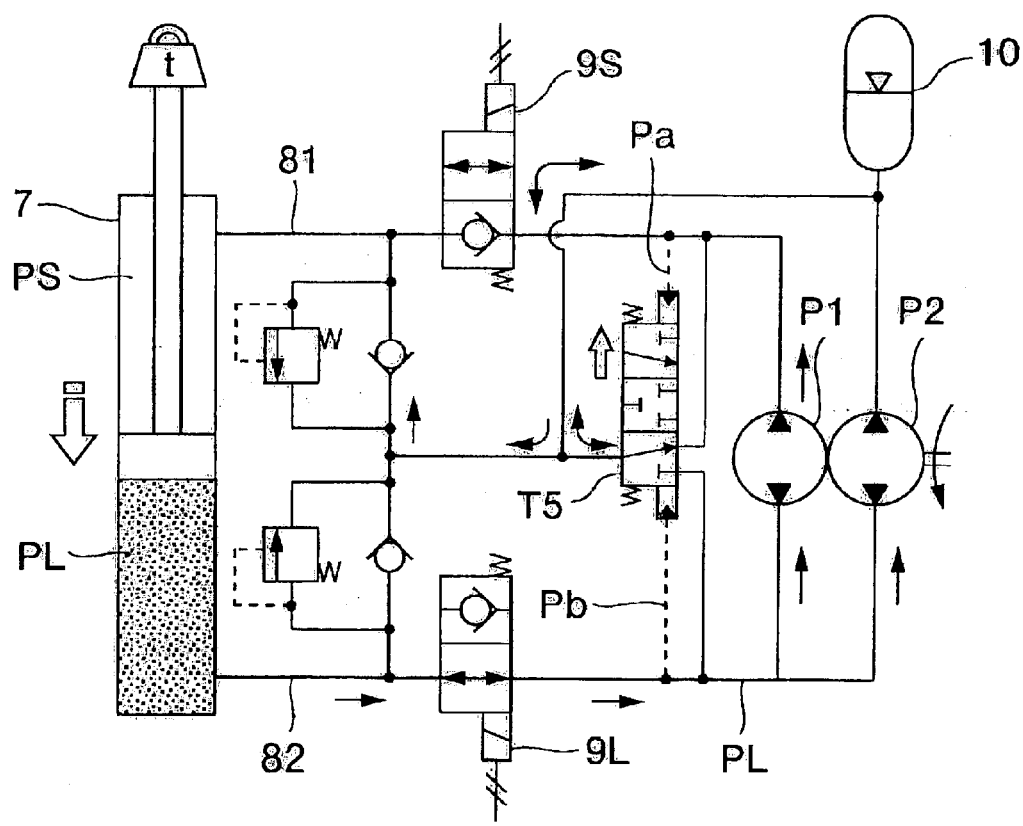
FIG. 24 is a diagram in which the second on-off valve is opened after the electric motor is rotated.

In the second example, when the electric motor M is rotated in the cylinder contracting direction, the third switching valve T5 is switched from the center position to the upper position, resulting in "PL>PB, Pb=Pa= accumulated pressure" (FIG. 23). Subsequently, the second on-off valve 9L is opened (FIG. 24), and thereby the third switching valve T5 is switched from the upper position to the lower position via the center position, resulting in "PL=Pb, PS=Pb=accumulated pressure", whereby the cylinder 7 contracts according to the rotation.

Accordingly, when the third switching valve T5 is switched from the upper position to the lower position via the center position, the cylinder slightly contracts by a length corresponding to the quantity of oil necessary to switch the third switching valve T5 from the upper position to the lower position, whereby undesired two-stage contraction of the cylinder 7 occurs. Contrary to this, in the aforementioned suitable control example, the undesired two-stage contraction does not occur to the cylinder 7.

Moreover, the third switching valve T5 reaches from the center position to the lower position via the upper position and the center position. On the other hand, the third switching valve T5 in the aforementioned suitable control example only reaches from the center position to the lower position. Namely, in the second example, as compared with the control example, the number of times of movements of a sliding member such as a spool of the third switching member and its moving distance are larger, correspondingly bringing about the fears of the abrasion of spool of the third switching valve T5 and response delay.

In the aforementioned suitable control example, the controller 20 rotates the electric motor M for only a predetermined time (for example, 0.05 seconds to 0.2 seconds) in a direction reverse to a designated rotation direction when the rotation of the electric motor M is started, and after the predetermined time, rotates the electric motor M in the designated rotation direction, and this predetermined time can be changed as follows. Namely, the controller 20 stores operation patterns shown in FIG. 25 to FIG. 27 in advance. It should be noted that in each drawing, the horizontal axis represents the tilt angle of the operating layer 21 and that the horizontal axis represents pump rotation speed.

Figure 25:
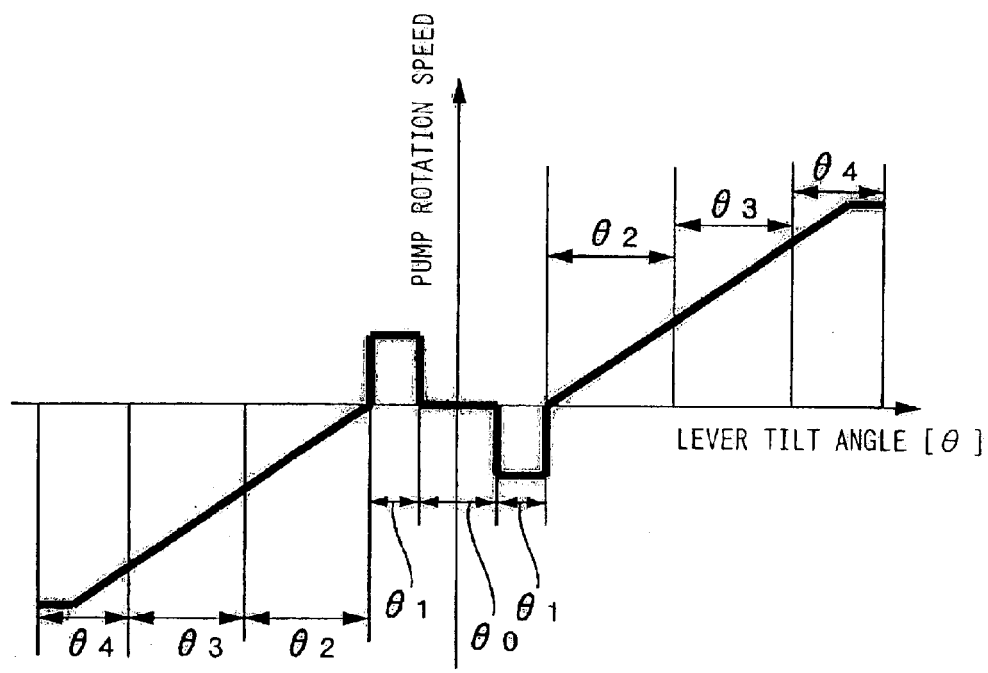
FIG. 25 shows an ordinary operation pattern between the tilt angle of the operating lever and the pump rotation speed.
Figure 26:
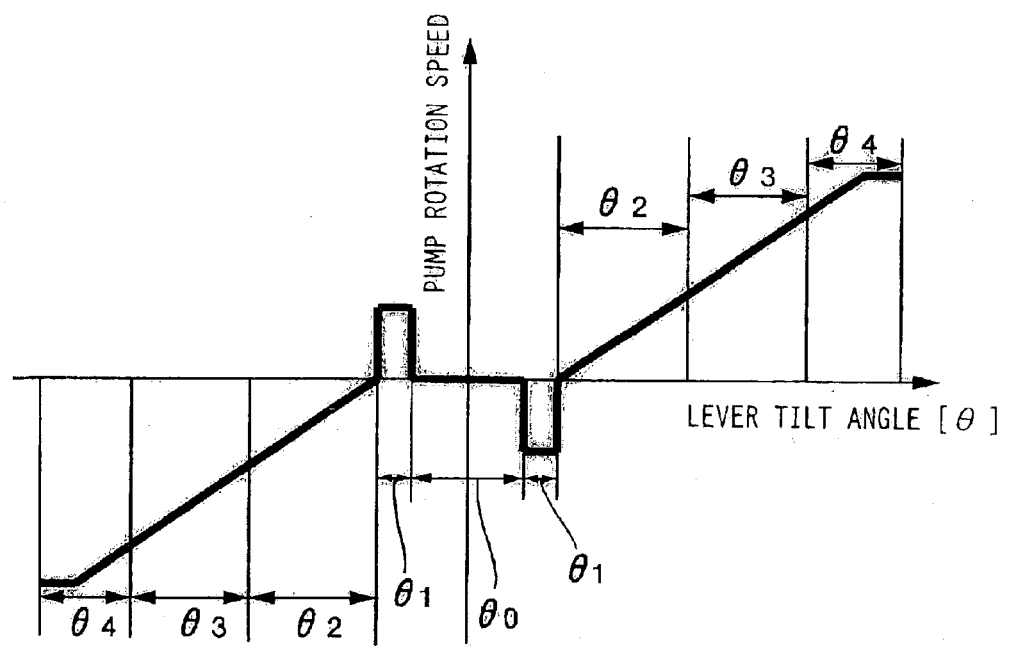
FIG. 26 shows a rapid operation pattern between the tilt angle of the operating lever and the pump rotation speed.

FIG. 25 shows a basic pattern. When the operating lever 21 is gradually tilted from its neutral position, as the tilt angle $\theta$ increases, first in a dead zone detection range $\theta 0$, the controller 20 outputs nothing to the inverter 32. Subsequently, when the tilt angle $\theta$ reaches a reverse rotation detection range $\theta 1$, it reversely rotates the electric motor M only during the passage of this range (preferably, the aforementioned predetermined time as the minimum). Thereafter, the controller 20 stores a maximum tilt angle $\theta$ MAX formed by a point in time when the tilt angle $\theta$ returns to the dead zone detection range $\theta 0$ next time. When the operating lever 21 is returned and the tilt angle $\theta$ reaches the dead zone detection range $\theta 0$, the controller 20 verifies whether the maximum tilt angle $\theta$ MAX in the previous operation is "$\theta 2 \leq \theta MAX \leq \theta 3$", "$\theta MAX > \theta 3$", or "$\theta MAX < \theta 2$".

If "$\theta 2 \leq \theta MAX \leq \theta 3$", the controller 20 performs the next operation in the pattern in FIG. 25 without any change. If "$\theta MAX > \theta 3$", the controller 20 performs the next operation based on FIG. 26. More specifically, as shown by the pattern in FIG. 26, this case shows that the cylinder extending/contracting operation is a rapid operation, and hence, the dead zone detection range $\theta 0$ is made longer and the reverse rotation detection range $\theta 1$ is made shorter. Even in the rapid operation, a dead zone is indispensable to improvement in the responsibility of control, and because of the rapid operation, the securement of the dead zone is ensured by making the dead zone detection range $\theta 0$ longer. On the other hand, in the rapid operation, the reverse rotation detection range $\theta 1$ may be a short time, or may be eliminated.

Figure 27:
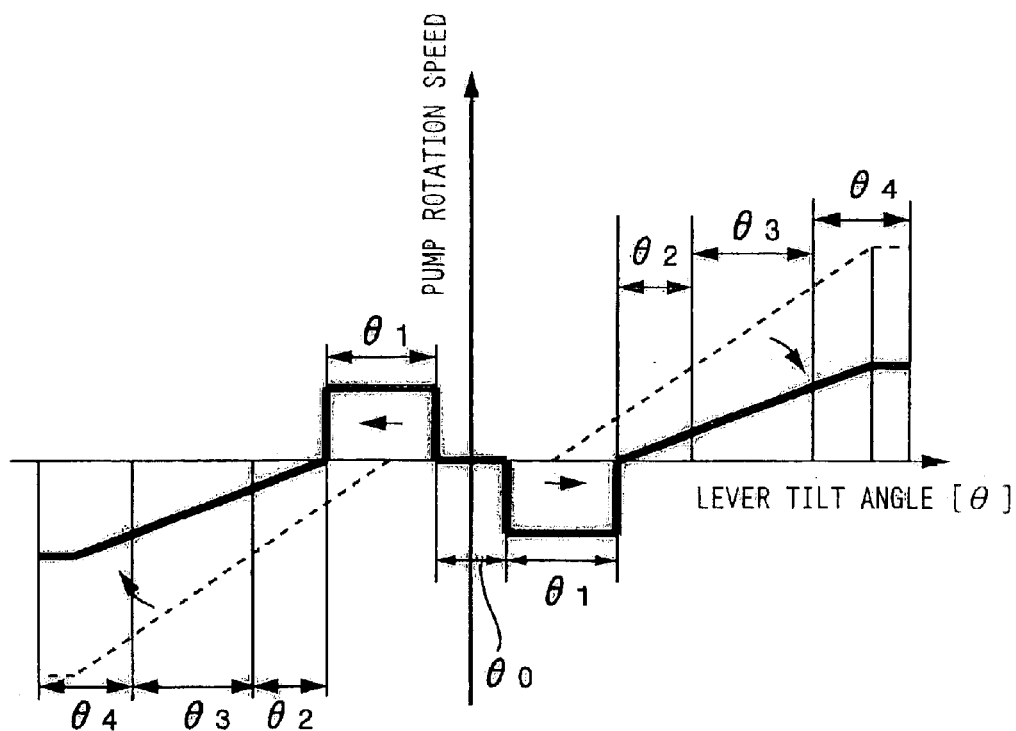
FIG. 27 shows a fine operation pattern between the tilt angle of the operating lever and the pump rotation speed.

If "$\theta MAX < \theta 2$", the controller 20 performs the next operation based on FIG. 27. Namely, in this case, the cylinder extending/contracting operation is performed in a fine operation pattern. In other words, control that secures the amount of extension/contraction of the cylinder 7 with high precision is desired. In this case, in the fine operation pattern in FIG. 27, the relation between the tilt angle $\theta$ and the pump rotation speed is changed in the controller 20 as shown by a change from a dotted line to a full line in FIG. 27. Incidentally, in this fine operation, since the tilt angle $\theta$ frequently rushes into the reverse rotation detection range $\theta 1$ and the fine operation is provided, it is desirable to certainly obtain the state in FIG. 19 (that is, "PL=Pb") and prevent the accidental contraction of the cylinder in FIG. 20 (and accidental extension of the cylinder 7 although not shown). For this prevention, it is necessary to secure the sufficiently long reverse rotation detection range $\theta 1$, namely, to secure a sufficiently long reverse rotation time to attain to the aforementioned state in FIG. 19 (that is, "PL=Pb"). It should be noted that a return signal from FIG. 27 to FIG. 25 may be made by detecting the maximum tilt angle $\theta$ MAX in FIG. 27.

Figure 28:
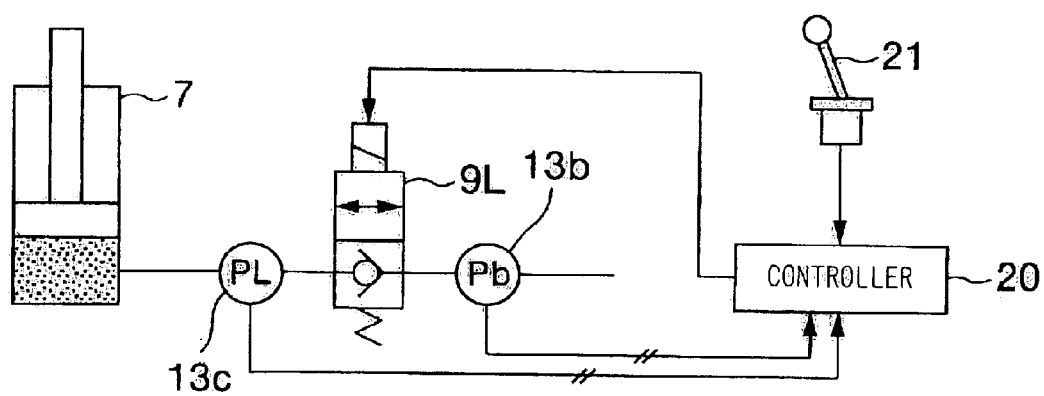
FIG. 28 is a diagram showing an example of attachment of a second and a third hydraulic detector.

Incidentally, although the aforementioned verification of "the state in FIG. 19 (that is, "PL=Pb")" is important, and as shown in FIG. 28, this verification is surely performed by providing a third oil pressure detector 13c for detecting the oil pressure PL from the bottom side pressure receiving chamber 7L in addition to the second oil pressure detector 13b for detecting the oil pressure Pb, leading these detected pressures to the controller 20, and performing verification. Incidentally, although not shown, it is certain to provide the third oil pressure detector 13c for detecting the oil pressure PS from the head side pressure receiving chamber 7S in addition to the first oil pressure detector 13a, leading these detected pressures to the controller, and perform verification.

Figure 29:
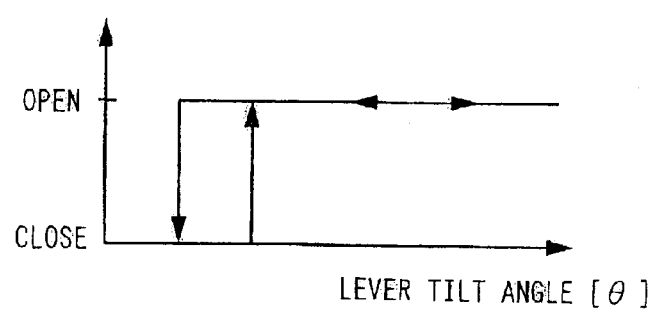
FIG. 29 is an open/close hysteresis diagram of the on-off valve.

As a supplementary explanation, when the first and second on-off valves 9S and 9L are opened, it is required to correctly provide the aforementioned dead zone detection range $\theta 0$ and reverse rotation detection range $\theta 1$ and obtain highly precise extension/contraction. However, in the case of closing, it is not necessary to care about it so much, and if a remark is ventured, it is recommended to provide the dead zone detection range $\theta 0$. Namely, as shown in FIG. 29, the tilt angle $\theta$ may be large when the first and second on-off valves 9S and 9L start to open and may be small when they are closed. If the open/close timing is made hysteretic, the entire responsibility of the open/close time can be improved.

The operation and effects of a principal portion of the aforementioned embodiments will be described below although there are overlaps.

(1) When the first hydraulic pumps P1 suck oil in the head side pressure receiving chambers 7S and discharge it to the bottom side pressure receiving chambers 7L, the second hydraulic pumps P2 suck oil in the accumulator 10 and discharge it to the bottom side pressure receiving chambers 7L. Consequently, the hydraulic cylinders 7 are extended. Conversely, when the first hydraulic pumps P1 suck oil in the bottom side pressure receiving chambers 7L and discharge it to the head side pressure receiving chambers 7S, the second hydraulic pumps P2 suck the oil in the bottom side pressure receiving chambers 7L and discharge it to the accumulator 10. Consequently, the hydraulic cylinders 7 is contracted. Since the relation of approximately "A1:A2=Q1: (Q1+Q2)" is established here, the extension and contraction of the hydraulic cylinders 7 can be performed with a just enough quantity of oil. When the first and second hydraulic pumps P1 and P2 are reversely driven by external loads, the electric motors M are rotated to produce electricity (generate electricity). This electromotive force is stored in the secondary battery 33 and recovered as energy, and together with electric power from the generator G or by being switched, it becomes driving electric power of the electric motors M. In other words, energy regeneration occurs.

Incidentally, the first and second hydraulic pumps P1 and P2 have the function of a direction switching valve in open circuits. The direction switching valve controls the flow rate with a throttling operation in addition to the switching of the flow direction of oil, and hence it involves throttling loss (heat loss). However, the flow rate control by the first and second hydraulic pumps P1 and P2 in the aforementioned embodiments is performed by only driving of both the pumps P1 and P2, whereby no throttling loss occurs, thus producing an energy saving effect also in this case. Needless to say, since there is no direction switching valve, an economic effect is also produced correspondingly.

Moreover, the oil quantity of each of the hydraulic cylinders 7 at the time of extension/contraction depends on the discharge/suction of oil by both the pumps P1 and P2. Accordingly, even when subjected to external loads, the hydraulic cylinders 7 are difficult to extend/contract by themselves if both the pumps P1 and P2 are stopped.

Incidentally, in case of the hydraulic cylinder always subjected to an external load, in a prior art, the extension/contraction (runaway) of the hydraulic cylinder by the external load is prevented by providing a counterbalance valve, but in the aforementioned embodiments, the oil quantity of each of the hydraulic cylinders 7 at the time of extension/contraction depends on the discharge/suction of oil by both the pumps P1 and P2, whereby the extension/contraction of the hydraulic cylinders 7 is put under the control of the operator without the hydraulic cylinders 7 extending/contracting by themselves. Accordingly, the counterbalance valve is not provided.

Meanwhile, as stated above, when the hydraulic cylinders 7 are contracted by the external loads, the accumulator 10 accumulates a part of the external loads as hydraulic energy. The hydraulic energy accumulated by the accumulator 10 is regenerated at the time of extension of the hydraulic cylinders 7.

Furthermore, the accumulator 10 directly pressurizes the accumulator sides of the second hydraulic pumps P2 and indirectly pressurizes the second hydraulic pump P2 sides of the first hydraulic pumps P1. Hence, the occurrence of basic disadvantages in the hydraulic circuits such as aeration cavitation, pitting, and the like in both the pump P1 and P2 is reduced.

Incidentally, aeration means that with the sharp pressure drop of a fluid, air which has dissolved in the fluid becomes bubbles, cavitation means that with the sharp pressure drop of a fluid, the fluid itself becomes bubbles by vaporization, and pitting means, for example, damage to a gear surface of a gear pump caused by the burst of bubbles in a fluid with an extremely sharp pressure rise of the fluid and vibrations.

(2) Moreover, the energy saving effect by the accumulator 10 based on the contraction of the cylinders 7 is directly exerted on only respective hydraulic cylinder driving hydraulic circuits connected to the accumulator 10, whereas the energy saving effect by the storage battery 33 based on the contraction of the hydraulic cylinders 7 is exerted on the respective hydraulic cylinder driving hydraulic circuits and the electric motor MS for rotation.

INDUSTRIAL AVAILABILITY

The present invention is useful as a hybrid machine with a hydraulic drive device having hydraulic actuators allowed to operate against and by external loads.

What is claimed is:

1. A hybrid machine with a hydraulic drive device, comprising a power source, a generator driven by power of said power source, electric motors, and a secondary battery for storing electromotive force of said electric motors generated by reverse driving of said electric motors by external loads, said electric motors receiving electric power from said generator and said secondary battery so as to be driven, said hybrid machine comprising:

hydraulic cylinders allowed to be extended and contracted against and by external loads;

first hydraulic pumps connected, with closed circuits, to head side pressure receiving chambers and bottom side pressure receiving chambers of said hydraulic cylinders; and second hydraulic pumps connected, with open circuits, to said bottom side pressure receiving chambers and an external oil chamber, wherein said first and second hydraulic pumps are connected to said electric motors so as to be driven.

2. The hybrid machine with the hydraulic drive device according to claim 1, wherein said first and second hydraulic pumps have a relation of approximately "A1:A2=Q1:(Q1+Q2)", where A1 is a piston pressure receiving area of said head side pressure receiving chamber, A2 is a piston pressure receiving area of said bottom side pressure receiving chamber, Q1 is a discharge amount per unit time of said first hydraulic pump, and Q2 is a discharge amount per unit time of said second hydraulic pump.

3. A hybrid machine with a hydraulic drive device, comprising a power source, a generator driven by power of said power source, electric motors, and a secondary battery for storing electromotive force of said electric motors generated by reverse driving of said electric motors by external loads, said electric motors receiving electric power from said generator and said secondary battery so as to be driven, said hybrid machine comprising:

hydraulic cylinders allowed to be extended and contracted against and by external loads;

first hydraulic pumps connected, with closed circuits, to head side pressure receiving chambers and bottom side pressure receiving chambers of said hydraulic cylinders; and second hydraulic pumps connected, with open circuits, to said bottom side pressure receiving chambers and an external accumulator, wherein said first and second hydraulic pumps are connected to said electric motors so as to be driven.

4. The hybrid machine with the hydraulic drive device according to claim 3, wherein said first and second hydraulic pumps are inclined shaft type piston pumps, and said electric motor is of a double end output shaft type, and wherein said first hydraulic pump is connected to one of a double end output shaft, and said second hydraulic pump is connected to the other thereof.

5. The hybrid machine with the hydraulic drive device according to claim 3, wherein said accumulator is of a maximum operating pressure variable type.

6. The hybrid machine with the hydraulic drive device according to claim 3, wherein with respect to a first passage which connects said first hydraulic pump and said head side pressure receiving chamber, a drive torque of said electric motor equal to a product value of a first relief pressure determined in advance for said first passage, and a sum of respective displacements per one rotation of said first and second hydraulic pumps is a maximum drive torque of said electric motor, and with respect to a second passage which connects said first and second hydraulic pumps and said bottom side pressure receiving chamber, a drive torque of said electric motor equal to a product value of a second relief pressure determined in advance for said second passage, and the sum of respective displacements per one rotation of said first and second hydraulic pumps is a maximum drive torque of said electric motor.

7. The hybrid machine with the hydraulic drive device according to claim 3, wherein when at least one of said first and second hydraulic pumps is a piston pump, oil sumps which catch external leakage of oil from said piston pump, a third hydraulic pump which sucks the oil in said oil sumps, and a first switching valve which selectably leads discharged oil from said third hydraulic pump to either one of said accumulator or said oil sumps are provided.

8. The hybrid machine with the hydraulic drive device according any one of claims 3 to 7, wherein when a predetermined portion of said first passage which connects said first hydraulic pump and said head side pressure receiving chamber is defined as a first connection point, and a predetermined portion of said second passage which connects said first and second hydraulic pumps and said bottom side pressure receiving chamber is defined as a second connection point, a passage which connects said accumulator and said first connection point is provided, and a first check valve which permits only oil flow to said first connection point is provided in this passage, and a passage which connects said accumulator and said second connection point is provided, and a second check valve which permits only oil flow to said second connection point is provided in this passage.

9. The hybrid machine with the hydraulic drive device according to any one of claims 3 to 7, wherein a first on-off valve is provided in said first passage which connects said first hydraulic pump and said head side pressure receiving chamber, and wherein a second on-off valve is provided in said second passage which connects said first and second hydraulic pumps and said bottom side pressure receiving chamber.

10. The hybrid machine with the hydraulic drive device according any one of claims 3 to 7, wherein when a predetermined portion of said first passage which connects said first hydraulic pump and said bead side pressure receiving chamber is defined as a first connection point, and a predetermined portion of said second passage which connects said first and second hydraulic pumps and said bottom side pressure receiving chamber is defined as a second connection point, a passage which connects said accumulator and said first connection point is provided, and a first check valve which permits only oil flow to said first connection point is provided in this passage, and a passage which connects said accumulator and said second connection point is provided, and a second check valve which permits only oil flow to said second connection point is provided in this passage, further a first on-off valve is provided between said first hydraulic pump and said first connection point in said first passage, and a second on-off valve is provided between said first and second hydraulic pumps and said second connection point in said second passage, and a third switching valve which comprises:

a first port opening into a passage leading to said accumulator;

a second port opening into a passage leading to a point between said first hydraulic pump and said first on-off valve of said first passage; and a third port opening into a passage leading to a point between said first and second hydraulic pumps and said second on-off valve of said second passage, receives oil pressure Pa of said first passage as pilot pressure at a pressure receiving portion on one end side, on the other hand receives pressure Pb of said second passage as pilot pressure at a pressure receiving portion on the other end side, and which comprises:

a first position which allows only said first and second ports to communicate with each other in the inside when "Pa<Pb";

a second position which allows only said first and third ports to communicate with each other in the inside when "Pb<Pa"; and a third position which allows all of said first to third ports to be interrupted from one another in the inside when "Pa=Pb", is provided.

11. The hybrid machine with the hydraulic drive device according to claim 10,
wherein a controller for rotating said electric motor for only a predetermined time in a direction reverse to a designated rotation direction when the rotation of said electric motor is started, and after the predetermined time, rotating said electric motor in the designated rotation direction is provided.

12. A hybrid machine with a hydraulic drive device, comprising a power source, a generator driven by power of said power source, electric motors, and a secondary battery for storing electromotive force of said electric motors generated by reverse driving of said electric motors by external loads, said electric motors receiving electric power from said generator and said secondary battery so as to be driven, said hybrid machine comprising:
hydraulic cylinders allowed to be extended and contracted against and by external loads;
first hydraulic pumps connected, with closed circuits, to head side pressure receiving chambers and bottom side pressure receiving chambers of said hydraulic cylinders; and
second hydraulic pumps connected, with open circuits, to said bottom side pressure receiving chambers and an external accumulator,
wherein said first and second hydraulic pumps are connected to said electric motors so as to be driven; and
wherein an on-off valve which allows said second hydraulic pump and said accumulator to be interrupted from each other is provided in a passage from said second hydraulic pump to said accumulator.

13. The hybrid machine with the hydraulic drive device according to claim 12,
wherein said first and second hydraulic pumps are inclined shaft type piston pumps, and said electric motor is of a double end output shaft type, and
wherein said first hydraulic pump is connected to one of a double end output shaft, and said second hydraulic pump is connected to the other thereof.

14. The hybrid machine with the hydraulic drive device according to claim 12,
wherein said accumulator is of a maximum operating pressure variable type.

15. The hybrid machine with the hydraulic drive device according to claim 12,
wherein with respect to a first passage which connects said first hydraulic pump and said head side pressure receiving chamber, a drive torque of said electric motor equal to a product value of a first relief pressure determined in advance for said first passage, and a sum of respective displacements per one rotation of said first and second hydraulic pumps is a maximum drive torque of said electric motor, and with respect to a second passage which connects said first and second hydraulic pumps and said bottom side pressure receiving chamber, a drive torque of said electric motor equal to a product value of a second relief pressure determined in advance for said second passage, and the sum of respective displacements per one rotation of said first and second hydraulic pumps is a maximum drive torque of said electric motor.

16. The hybrid machine with the hydraulic drive device according to claim 12,
wherein when at least one of said first and second hydraulic pumps is a piston pump, oil sumps which catch external leakage of oil from said piston pump, a third hydraulic pump which sucks the oil in said oil sumps, and a first switching valve which selectably leads discharged oil from said third hydraulic pump to either one of said accumulator or said oil sumps are provided.

17. The hybrid machine with the hydraulic drive device according to claim 16,
wherein a variable relief valve is provided in said first and second passages, and
wherein a second switching valve for selectively draining drain oil to either one of said accumulator or said oil sumps is provided on the drain side of said variable relief valve.

18. The hybrid machine with the hydraulic drive device according to claim 12,
wherein when a predetermined portion of said first passage which connects said first hydraulic pump and said head side pressure receiving chamber is defined as a first connection point, and a predetermined portion of said second passage which connects said first and second hydraulic pumps and said bottom side pressure receiving chamber is defined as a second connection point, a passage which connects said accumulator and said first connection point is provided, and a first check valve which permits only oil flow to said first connection point is provided in this passage, and a passage which connects said accumulator and said second connection point is provided, and a second check valve which permits only oil flow to said second connection point is provided in this passage.

19. The hybrid machine with the hydraulic drive device according to claim 12,
wherein a first on-off valve is provided in said first passage which connects said first hydraulic pump and said head side pressure receiving chamber, and
wherein a second on-off valve is provided in said second passage which connects said first and second hydraulic pumps and said bottom side pressure receiving chamber.

20. The hybrid machine with the hydraulic drive device according to claim 12,
wherein when a predetermined portion of said first passage which connects said first hydraulic pump and said head side pressure receiving chamber is defined as a first connection point, and a predetermined portion of said second passage which connects said first and second hydraulic pumps and said bottom side pressure receiving chamber is defined as a second connection point, a passage which connects said accumulator and said first connection point is provided, and a first check valve which permits only oil flow to said first connection point is provided in this passage, and a passage which connects said accumulator and said second connection point is provided, and a second check valve which permits only oil flow to said second connection point is provided in this passage, further a first on-off valve is provided between said first hydraulic pump and said first connection point in said first passage, and a second on-off valve is provided between said first and second hydraulic pumps and said second connection point in said second passage, and a third switching valve which comprises: a first port opening into a passage leading to said accumulator, a second port opening into a passage leading to a point between said first hydraulic pump and said first on-off valve of said first passage; and a third port opening into a passage leading to a point between said first and second hydraulic pumps and said second on-off valve of said second passage,
receives oil pressure Pa of said first passage as pilot pressure at a pressure receiving portion on one end side, on the other hand receives pressure Pb of said second passage as pilot pressure at a pressure receiving portion on the other end side, and which comprises:
- a first position which allows only said first and second ports to communicate with each other in the inside when "Pa<Pb";
- a second position which allows only said first and third ports to communicate with each other in the inside when "Pb<Pa"; and
- a third position which allows all of said first to third ports to be interrupted from one another in the inside when "Pa=Pb", is provided.

21. The hybrid machine with the hydraulic drive device according to claim 20,
wherein a controller for rotating said electric motor for only a predetermined time in a direction reverse to a designated rotation direction when the rotation of said electric motor is started, and after the predetermined time, rotating said electric motor in the designated rotation direction is provided.

22. A hybrid machine with a hydraulic drive device, comprising a power source, a generator driven by power of said power source, electric motors, and a secondary battery for storing electromotive force of said electric motors generated by reverse driving of said electric motors by external loads, said electric motors receiving electric power from said generator and said secondary battery so as to be driven, said hybrid machine comprising:
- hydraulic cylinders allowed to be extended and contracted against and by external loads;
- first hydraulic pumps connected, with closed circuits, to head side pressure receiving chambers and bottom side pressure receiving chambers of said hydraulic cylinders; and
- second hydraulic pumps connected, with open circuits, to said bottom side pressure receiving chambers and an external accumulator,
wherein said first and second hydraulic pumps are connected to said electric motors so as to be driven,
wherein when at least one of said first and second hydraulic pumps is a piston pump, oil sumps which catch external leakage of oil from said piston pump, a third hydraulic pump which sucks the oil in said oil sumps, and a first switching valve which selectably leads discharged oil from said third hydraulic pump to either one of said accumulator or said oil sumps are provided,
wherein a variable relief valve is provided in said first and second passages, and
wherein a second switching valve for selectively draining drain oil to either one of said accumulator or said oil sumps is provided on the drain side of said variable relief valve.

23. The hybrid machine with the hydraulic drive device according to claim 22,
wherein said first and second hydraulic pumps are inclined shaft type piston pumps, and said electric motor is of a double end output shaft type, and
wherein said first hydraulic pump is connected to one of a double end output shaft, and said second hydraulic pump is connected to the other thereof.

24. The hybrid machine with the hydraulic drive device according to claim 22,
wherein said accumulator is of a maximum operating pressure variable type.

25. The hybrid machine with the hydraulic drive device according to claim 22,
wherein with respect to a first passage which connects said first hydraulic pump and said head side pressure receiving chamber, a drive torque of said electric motor equal to a product value of a first relief pressure determined in advance for said first passage, and
a sum of respective displacements per one rotation of said first and second hydraulic pumps is a maximum drive torque of said electric motor, and with respect to a second passage which connects said first and second hydraulic pumps and said bottom side pressure receiving chamber, a drive torque of said electric motor equal to a product value of a second relief pressure determined in advance for said second passage, and the sum of respective displacements per one rotation of said first and second hydraulic pumps is a maximum drive torque of said electric motor.

26. The hybrid machine with the hydraulic drive device according to claim 22,
wherein when a predetermined portion of said first passage which connects said first hydraulic pump and said head side pressure receiving chamber is defined as a first connection point, and a predetermined portion of said second passage which connects said first and second hydraulic pumps and said bottom side pressure receiving chamber is defined as a second connection point, a passage which connects said accumulator and said first connection point is provided, and a first check valve which permits only oil flow to said first connection point is provided in this passage, and a passage which connects said accumulator and said second connection point is provided, and a second check valve which permits only oil flow to said second connection point is provided in this passage.

27. The hybrid machine with the hydraulic drive device according to claim 22,
wherein a first on-off valve is provided in said first passage which connects said first hydraulic pump and said head side pressure receiving chamber, and
wherein a second on-off valve is provided in said second passage which connects said first and second hydraulic pumps and said bottom side pressure receiving chamber.

28. The hybrid machine with the hydraulic drive device according to claim 22,
wherein when a predetermined portion of said first passage which connects said first hydraulic pump and said head side pressure receiving chamber is defined as a first connection point, and a predetermined portion of said second passage which connects said first and second hydraulic pumps and said bottom side pressure receiving chamber is defined as a second connection point, a passage which connects said accumulator and said first connection point is provided, and a first check valve which permits only oil flow to said first connection point is provided in this passage, and a passage which connects said accumulator and said second connection point is provided, and a second check valve which permits only oil flow to said second connection point is provided in this passage, further a first on-off valve is provided between said first hydraulic pump and said first connection point in said first passage, and a second on-off valve is provided between said first and second hydraulic pumps and said second connection point in said second passage, and a third switching valve which comprises:

a first port opening into a passage leading to said accumulator;

a second port opening into a passage leading to a point between said first hydraulic pump and said first on-off valve of said first passage; and a third port opening into a passage leading to a point between said first and second hydraulic pumps and said second on-off valve of said second passage, receives oil pressure Pa of said first passage as pilot pressure at a pressure receiving portion on one end side, on the other hand receives pressure Pb of said second passage as pilot pressure at a pressure receiving portion on the other end side, and which comprises:

a first position which allows only said first and second ports to communicate with each other in the inside when "Pa<Pb";

a second position which allows only said first and third ports to communicate with each other in the inside when "Pb<Pa"; and a third position which allows all of said first to third ports to be interrupted from one another in the inside when "Pa=Pb", is provided.

29. The hybrid machine with the hydraulic drive device according to claim 28, wherein a controller for rotating said electric motor for only a predetermined time in a direction reverse to a designated rotation direction when the rotation of said electric motor is started, and after the predetermined time, rotating said electric motor in the designated rotation direction is provided.

* * * * *

UNITED STATES PATENT AND TRADEMARK OFFICE
CERTIFICATE OF CORRECTION

PATENT NO.    : 6,962,050 B2
DATED         : November 8, 2005
INVENTOR(S)   : Hikosaburo Hiraki It is certified that error appears in the above-identified patent and that said Letters Patent is hereby corrected as shown below:

Column 33,
Line 67, "according any" should read -- according to any --.

Column 34,
Line 25, "according any" should read -- according to any --.
Line 28, "bead" should read -- head --.

Signed and Sealed this

Eighteenth Day of April, 2006

JON W. DUDAS
*Director of the United States Patent and Trademark Office*